(12) United States Patent
Kim et al.

(10) Patent No.: US 12,213,170 B2
(45) Date of Patent: Jan. 28, 2025

(54) METHOD AND APPARATUS FOR PERFORMING HANDOVER OF TERMINAL IN WIRELESS COMMUNICATION SYSTEM

(71) Applicant: Samsung Electronics Co., Ltd., Gyeonggi-do (KR)

(72) Inventors: Youngbum Kim, Gyeonggi-do (KR); Jinkyu Kang, Gyeonggi-do (KR); Taehyoung Kim, Gyeonggi-do (KR); Seunghoon Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/987,678

(22) Filed: Aug. 7, 2020

(65) Prior Publication Data

US 2021/0045023 A1    Feb. 11, 2021

(30) Foreign Application Priority Data

Aug. 7, 2019    (KR) ........................ 10-2019-0096183

(51) Int. Cl.
*H04W 74/08*    (2024.01)
*H04W 36/00*    (2009.01)
(Continued)

(52) U.S. Cl.
CPC ..... *H04W 74/08* (2013.01); *H04W 36/00725* (2023.05); *H04W 56/0045* (2013.01);
(Continued)

(58) Field of Classification Search
CPC ......... H04W 36/0055; H04W 56/0045; H04W 72/0413; H04W 74/006; H04W 74/08;
(Continued)

(56) References Cited

U.S. PATENT DOCUMENTS

| 10,812,983 B2 | 10/2020 | Yeo et al. |
| 2018/0249427 A1 | 8/2018 | Dinan |

(Continued)

FOREIGN PATENT DOCUMENTS

| CN | 107750439 | 3/2018 |
| CN | 108632934 | 10/2018 |

(Continued)

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 15), 3GPP TS 36.300 V15.6.0, Jun. 2019, 365 pages.

(Continued)

*Primary Examiner* — Mazda Sabouri
(74) *Attorney, Agent, or Firm* — The Farrell Law Firm, P.C.

(57) ABSTRACT

A communication scheme and a system thereof are provided for converging IoT technology and a 5G communication system for supporting a high data transmission rate beyond that of a 4G system. The disclosure can be applied to intelligent services based on the 5G communication technology and the IoT-related technology. The disclosure provides a method of minimizing a handover delay and a handover failure possibility of the terminal in a mobile communication system, which includes receiving a handover command from a first BS; performing DL synchronization with a second BS; determining whether a first UL signal to be transmitted to the first BS and a second UL signal to be transmitted to the second BS overlap; and in response to determining that the first UL signal and the second UL signal overlap, transmitting the second UL signal (Continued)

to the second BS, wihtout transmitting the first UL signal to the first BS.

20 Claims, 14 Drawing Sheets

(51) Int. Cl.
 *H04W 36/08* (2009.01)
 *H04W 56/00* (2009.01)
 *H04W 72/21* (2023.01)
 *H04W 74/00* (2009.01)
 *H04W 76/27* (2018.01)

(52) U.S. Cl.
 CPC ......... *H04W 72/21* (2023.01); *H04W 74/006* (2013.01); *H04W 76/27* (2018.02); *H04W 36/0064* (2023.05); *H04W 36/085* (2023.05)

(58) Field of Classification Search
 CPC ............. H04W 76/27; H04W 36/0072; H04W 74/0891; H04W 36/0005; H04W 36/08
 See application file for complete search history.

(56) References Cited

U.S. PATENT DOCUMENTS

| | | |
|---|---|---|
| 2018/0332507 A1 | 11/2018 | Fujishiro et al. |
| 2018/0338271 A1 | 11/2018 | Park et al. |
| 2018/0359057 A1 | 12/2018 | Yang et al. |
| 2019/0116536 A1 | 4/2019 | Xu et al. |
| 2019/0150096 A1 | 5/2019 | Lee et al. |
| 2019/0159102 A1 | 5/2019 | Ryu et al. |
| 2019/0239196 A1* | 8/2019 | Lee .................. H04W 72/0413 |
| 2020/0022046 A1* | 1/2020 | Wang .................... H04W 36/28 |
| 2020/0296633 A1* | 9/2020 | Michalopoulos ... H04W 36/023 |
| 2021/0037434 A1* | 2/2021 | Tomala ............. H04W 74/0833 |

FOREIGN PATENT DOCUMENTS

| | | |
|---|---|---|
| WO | WO 2017/089872 | 6/2017 |
| WO | WO 2018/171738 | 9/2018 |

OTHER PUBLICATIONS

Ericsson, "DC Based Handover", R2-1907317, 3GPP TSG-RAN WG#106, May 13-17, 2019, 6 pages.
CMCC, "DC-Based HO/SCG Change Mechanism", R2-1905917, 3GPP TSG-RAN WG2 #106, May 13-17, 2019, 4 pages.
International Search Report dated Nov. 6, 2020 issued in counterpart application No. PCT/KR2020/010479, 3 pages.
MediaTek Inc., "Physical Layer Feasibility Considerations for Mobility Enhancement", R1-1908392, 3GPP TSG RAN WG1 Meeting RAN1 #98, Aug. 25-30, 2019, 11 pages.
Indian Examination Report dated Jul. 15, 2022 issued in counterpart application No. 202237006020, 6 pages.
European Search Report dated Sep. 13, 2022 issued in counterpart application No. 20850851.5-1216, 18 pages.
Chinese Office Action dated Mar. 7, 2024 issued in counterpart Application No. 202080056082.5, 19 pages.
Chinese Office Action dated Oct. 21, 2024 issued in counterpart Application No. 202080056082.5, 21 pages.
European Search Report dated Sep. 20, 2024 issued in counterpart application No. 20850851.5-1215, 15 pages.

* cited by examiner

METHOD AND APPARATUS FOR PERFORMING HANDOVER OF TERMINAL IN WIRELESS COMMUNICATION SYSTEM

CROSS-REFERENCE TO RELATED APPLICATION(S)

This application is based on and claims priority under 35 U.S.C. § 119 to Korean Patent Application No. 10-2019-0096183, filed on Aug. 7, 2019, in the Korean Intellectual Property Office, the entire disclosure of which is incorporated herein by reference.

BACKGROUND

1. Field

The disclosure relates generally to a cellular wireless communication system and a method of performing a handover of a terminal within the cellular wireless communication system.

2. Description of Related Art

To meet the increasing demand for wireless data traffic since deployment of $4^{th}$ generation (4G) communication systems, efforts have been made to develop an improved $5^{th}$ generaion (5G) or pre-5G communication system. The 5G or pre-5G communication system may also be referred to as a "Beyond 4G Network" or a "Post long term evolution (LTE) System". The 5G communication system is anticipated to be implemented in higher frequency (mmWave) bands, e.g., 60 GHz bands, to accomplish higher data rates. To decrease propagation loss of radio waves and increase transmission distances, beamforming, massive multiple-input multiple-output (MIMO), full dimensional MIMO (FD-MIMO), array antennas, an analog beam forming, and large scale antenna techniques are being discussed for use in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation, etc.

In a 5G system, hybrid frequency shift keying (FSK) and quadrature amplitude modulation (QAM) (FQAM) and sliding window superposition coding (SWSC) have been developed as an advanced coding modulation (ACM), and filter bank multi carrier (FBMC), non-orthogonal multiple access (NOMA), and sparse code multiple access (SCMA) have been developed as an advanced access technology.

The Internet is evolving to the Internet of things (IoT) where distributed entities, i.e., things, exchange and process information without human intervention. The Internet of everything (IoE), which is a combination of the IoT technology and big data processing technology through a connection with a cloud server, has also emerged.

As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), etc., have been researched. Such an IoT environment may provide intelligent Internet technology services that collect and analyze data generated among connected things. IoT may be applied to a variety of fields including smart homes, smart buildings, smart cities, smart cars or connected cars, smart grids, health care, smart appliances, and advanced medical services through convergence and combination between existing information technology (IT) and various industrial applications.

In line with this, various attempts have been made to apply 5G communication systems to IoT networks. For example, technologies such as sensor networks, MTC, and M2M communication may be implemented by beamfonning, MIMO, and array antennas.

Application of a cloud RAN as the above-described big data processing technology may also be considered an example of convergence of the 5G technology with the IoT technology.

SUMMARY

An aspect of the disclosure is to provide a method of minimizing a handover delay of a terminal and minimizing a possibility of handover failure in a mobile communication system.

In accordance with an aspect of the disclosure, a method is provided for processing control signals in a wireless communication system. The method includes receiving a handover command from a first Base Station (BS); performing downlink (DL) synchronization with a second BS; determining whether a first uplink (UL) signal to be transmitted to the first BS and a second UL signal to be transmitted to the second BS overlap; and in response to determining that the first UL signal and the second UL signal overlap, transmitting the second UL signal to the second BS, wihtout transmitting the first UL signal to the first BS.

In accordance with an aspect of the disclosure, a method is provided for performing a handover by a second BS in a wireless communication system. The method includes receiving a handover request message from a first BS; transmitting a response message to the first BS in response to receiving the handover request message; and receiving a UL signal from a terminal. The UL signal is transmitted to the second BS, by the terminal, regardless of whether the UL signal and another UL signal, which is for the first BS, overlap.

In accordance with an aspect of the disclosure, a terminal is provided for performing a handover in a wireless communication system. The terminal includes a transceiver; and a controller coupled to the transceiver and configured to receive a handover command from a first BS, perform DL synchronization with a second BS, determine whether a first UL signal to be transmitted to the first BS and a second UL signal to be transmitted to the second BS overlap, and in response to determining that the first UL signal and the second UL signal overlap, transmit the second UL signal to the second BS, wihtout transmitting the first UL signal to the first BS.

In accordance with an aspect of the disclosure, a second BS is provided performing a handover in a wireless communication system. The second BS includes a transceiver; and a controller coupled to the transceiver and configured to receive a handover request message from a first BS, transmit a response message to the first BS in response to receving the handover request message, and receive an uplink (UL) signal from a terminal. The UL signal transmitted to the second BS, by the terminal, regardless of whether the UL signal and another UL signal, which is for the first BS, overlap.

BRIEF DESCRIPTION OF THE DRAWINGS

The above and other objects, features and advantages of certain embodiments of the disclosure will be more apparent from the following detailed description taken in conjunction with the accompanying drawings, in which.

DETAILED DESCRIPTION

Figure 1:
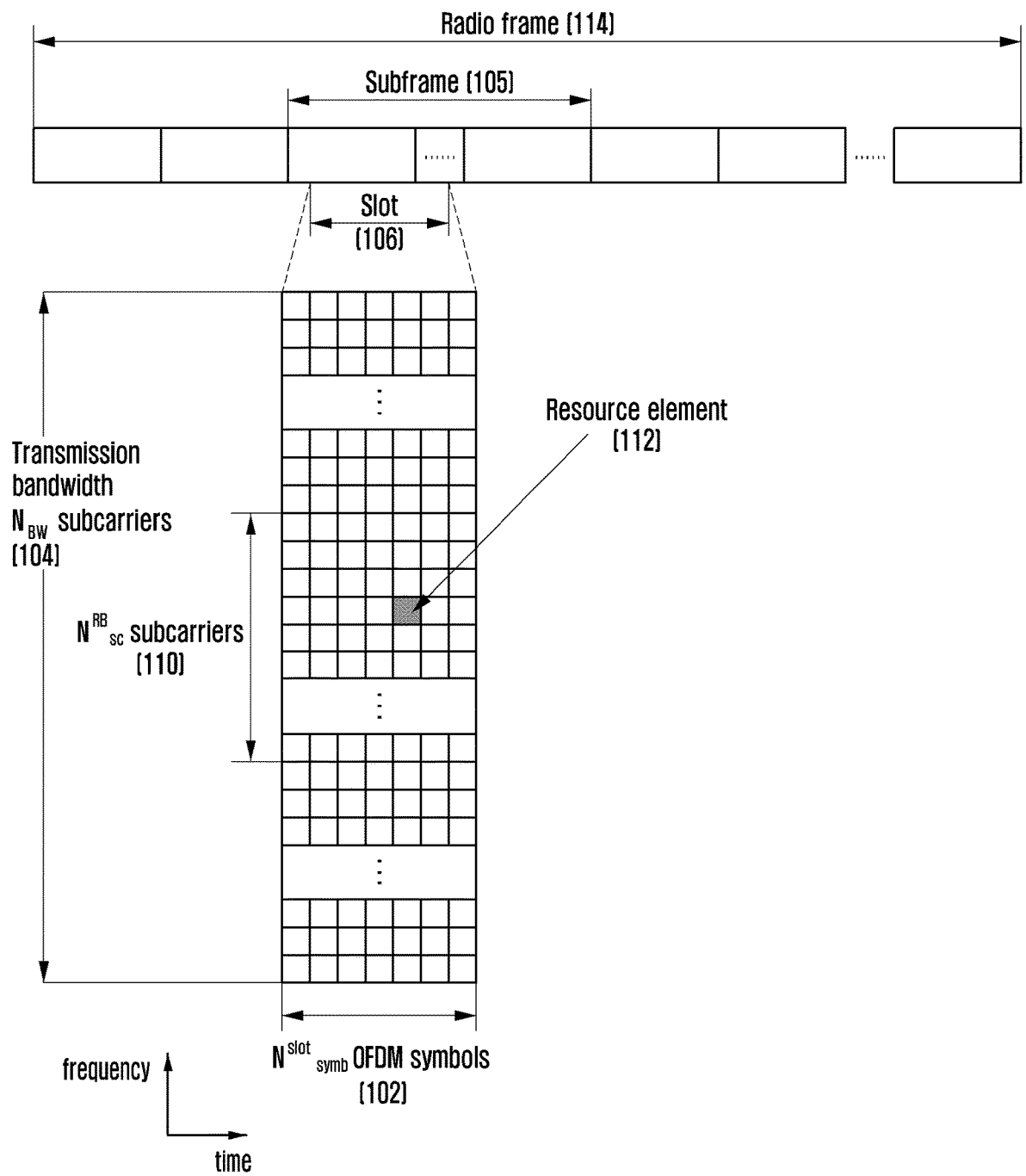
FIG. 1 illustrates time-frequency resource domains that are radio resource domains in which data or a control channel of a 5G system is transmitted.

Advantages and features of the disclosure and ways to achieve them will be apparent by referring to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims.

In describing embodiments of the disclosure, descriptions related to technical contents well-known in the art and not associated directly with the disclosure will be omitted to prevent obscuring of the disclosure.

In the accompanying drawings, some elements may be exaggerated, omitted, or schematically illustrated. Further, the size of each element does not necessarily reflect the actual size. Additionally, identical or corresponding elements may be provided with the same or similar reference numerals.

Each block of the flowcharts and combinations of blocks in the flowcharts can be implemented by computer program instructions. These computer program instructions can be provided to a processor of a general purpose computer, special purpose computer, or other programmable data processing apparatus to produce a machine, such that the instructions, which execute via the processor of the computer or other programmable data. processing apparatus, create a device for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Each block of the flowcharts may represent a module, segment, or portion of code, which includes one or more executable instructions for implementing the specified logical function(s). In some alternative implementations, the functions noted in the blocks may occur out of the order. For example, two blocks shown in succession may in instead be executed substantially concurrently or the blocks may sometimes be executed in the reverse order, depending upon the functionality involved.

Herein, the term "unit" may refer to a software element or a hardware element, such as a Field Programmable Gate Array (FPGA) or an Application Specific Integrated Circuit (ASIC), which performs a predetermined function. However, the term "unit" is not limited to software or hardware. A "unit" may be constructed either to be stored in an addressable storage medium or to execute one or more processors. Therefore, the "unit" may include software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Further, the elements and "units" or may be implemented to reproduce one or more central processing units (CPUs) within a device or a security multimedia card.

In the following description, the disclosure uses terms and names defined in the 3rd generation partnership project (3GPP) standards for the convenience of description. However, the disclosure is not limited by these terms and names, and may be applied in the same way to systems that conform other standards.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited b the terms as used below, and other terms referring to subjects having equivalent technical meanings may be used. For example, in the following description, the term "terminal" may refer to a MAC entity in each terminal that exists for each of a master cell group (MCG) and a secondary cell group (SCG) as described below.

Herein, a BS is an entity that allocates resources to a terminal, and may also be referred to as a Node B, an enode B (eNB), a gnode b (gNB), a radio access unit, a BS controller, or a node on a network. A terminal may include a user equipment (UE), a mobile station (MS), a cellular phone, a smart phone, a computer, or a multimedia system capable of performing a communication function. Of course, the disclosure is not limited thereto.

Embodiments of the disclosure may be applied to other communication systems having a technical background or channel form similar to embodiments of the disclosure described below. Embodiments of the disclosure may be applied to other communication systems through some modifications without departing from the scope of the disclosure.

The disclosure may be applied to 3GPP new radio (NR) (5G mobile communication standard). The disclosure may be applied to intelligent services (e.g., services related to a smart home, a smart building, a smart city, a smart car, a connected car, health care digital education, a retail business, security, and safety) based on the 5G communication technology and the IoT-related technology.

In the disclosure, the term "eNB" may be interchangeable with "gNB" for convenience of description. That is, a BS described as an eNB may indicate a gNB. Further, the term "terminal" may indicate mobile phones, NB-IoT devices, sensors, and other wireless communication devices.

In order to process the recent explosive increase in mobile data traffic, an initial standard of a 5G system or NR access technology that is a next-generation communication system after LTE (or evolved universal terrestrial radio access (E-UTRA)) and LTE-advanced (LTE-A or E-UTRA Evolution) has been completed. While conventional mobile communication systems generally focuses on voice/data communication, the 5G system is intended to meet various services and requirements such as an enhanced mobile broadband (eMBB) service for improving the conventional voice/data communication, ultra-reliable low-latency communication (URLLC) service, and massive MTC service supporting massive M2M communication.

While the bandwidth of a system transmission band (transmission bandwidth) for a single carrier in the conventional LTE and LTE-A systems is limited to a maximum of 20 MHz, the 5G system should support a super-high-speed data service reaching several Gbps using an ultra-wide bandwidth which is significantly wider than the LTE and LTE-A systems. Accordingly, the 5G system considers, as a candidate frequency, an ultra-high-frequency band from several GHz in which guaranteeing an ultra-wide bandwidth frequency is relatively easy to a maximum of 100 GHz. In addition, securing a wide bandwidth frequency for the 5G system by rearranging or allocating frequencies among the frequency bands included in hundreds of MHz to several GHz used by the conventional mobile communication system is under consideration.

A radio wave of the ultra-high-frequency band may also be called a millimeter wave (mmWave), having a wavelength of several mm. However, since a propagation path loss increases in proportion to frequency band in an ultra-high-frequency band, coverage of the mobile communication system becomes smaller.

In order to remove the disadvantage of the decreased coverage of the ultra-high-frequency band, a beamforming technology for increasing an arrival distance of the radio wave by concentrating the radiation energy of the radio wave on a predetermined target point through a plurality of antennas is an important issue. That is, signals to which the beamforming technology is applied have a relatively narrower beam width compared to a technology in which the beamforming technology is not applied, and the arrival distance of the radio wave increases since radiation energy is concentrated within the narrowed beam width. The beamforming technology may be applied to each of a transmitting side and a receiving side. The beamforming technology increases coverage increase and also reduces interference in areas out of the beamforming direction. In order to operate the beamforming technology, an accurate method of measuring and feeding back transmitted/received beams is needed. The beamforming technology may be applied to a control channel or a data channel between a predetermined terminal and a BS in one-to-one correspondence. Further, in order to increase coverage, the beamforming technology may be applied to a common signal that the BS transmits to a plurality of terminals within the system, e.g., a synchronization signal (SS), a physical broadcast channel (PBCH), and a control channel and a data channel for transmitting system information.

When the beamforming technology is applied to the common signal, a beam-sweeping technology for changing a beam direction and transmitting a signal may be additionally applied, and thus the common signal may reach terminals positioned at a predetermined location within the cell.

Another requirement of the 5G system is an ultra-low-latency service having a transmission delay between transmitting and receiving sides of about 1 ms. A method of reducing the transmission delay is to design a frame structure based on a short transmission time interval (TTI) compared to LTE and LIE-A. The TTI is a basic tune unit for scheduling, and the TTI in the conventional LTE and LTE-A systems is 1 ms, corresponding to one subframe length. For example, the short TTI to meet requirements of the ultra-low-latency service of the 5G system may include TTIs of 0.5 ms, 0.25 ms, and 0.125 ms, which are shorter than that of the conventional LTE and LTE-A systems.

FIG. 1 illustrates time-frequency resource domains that are radio resource domains in which data or a control channel of a 5G system is transmitted.

Referring to FIG. 1, the horizontal axis indicates a time domain, and the vertical axis indicates a frequency domain. A minimum transmission unit in the time domain of the 5G system is an orthogonal frequency division multiplexing (OFDM) symbol, one slot 106 may include $N_{symb}^{slot}$ symbols 102, and one subframe 105 may include $N_{slot}^{subframe}$ slots. The length of the subframe 105 is 1.0 ms, and a radio frame 114 of 10 ms includes 10 subframes. A minimum transmission unit in the frequency domain is a subcarrier, and the bandwidth of an entire system transmission band (transmission bandwidth) includes a total of $N_{BW}$ subcarriers 104.

A basic resource unit in the time-frequency domains is a resource element (RE) 112, which may be indicated by an OFDM symbol index and a subcarrier index. A resource block (RB) is defined as $N_{sc}^{RB}$ successive subcarriers 110 in the frequency domain. In the 5G system, $N_{sc}^{RB}=12$ and a data rate may increase in proportion to the number of RBs scheduled in the terminal.

In the 5G system, the BS may map data in units of RBs and generally schedule RBs included in one slot for a predetermined terminal. That is, in the 5G system, a basic time unit for scheduling is a slot, and a basic frequency unit for scheduling is an RB.

The number $N_{symb}^{slot}$ of OFDM symbols is defined according to the length of a cyclic prefix (CP) added to every symbol to prevent interference between symbols and, for example, $N_{symb}^{slot}$=14 when a normal CP is applied, and $N_{symb}^{slot}$=12 when an extended CP is applied. The extended CP is applied to a system having a relatively long propagation transmission distance compared to the normal CP and maintains orthogonality between symbols. In the case of the normal CP, a ratio between the CP length and the symbol length is maintained as a predetermined value, and thus overhead due to the CP may be constantly maintained regardless of subcarrier spacing. That is, when subcarrier spacing is small, the symbol length becomes longer and thus the CP length becomes longer. However, when subcarrier spacing is large, the symbol length becomes shorter and thus the CP lengths become shorter. The symbol length and the CP length may be inversely proportional to the subcarrier spacing.

The 5G system may support various frame structures by controlling subcarrier spacing in order to meet various services and requirements.

For example, in a viewpoint of an operation frequency band, it is advantageous to reconstruct phase noise of a high frequency band as subcarrier spacing is large.

In a viewpoint of a transmission time, when subcarrier spacing is large, the symbol length in the time domain becomes shorter. As a result, the slot length becomes shorter, and thus it is advantageous to support an ultra-low latency service like URLLC.

In a viewpoint of a cell size, a larger cell can be supported as the CP length is longer, and thus a relatively larger cell may be supported as subcarrier spacing is smaller.

The subcarrier spacing and the CP length are information for OFDM transmission and reception, and smooth transmission and reception are possible when the BS and the terminal recognize a common value as the information.

Table 1 below shows a relationship between a subcarrier spacing configuration μ, subcarrier spacing Δf, and the CP length, supported by the 5G system.

TABLE 1

| μ | Δf = $2^μ$ · 15[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Table 2 below shows the number $N_{symb}^{slot}$ of symbols per slot, the number $N_{slot}^{frame,\mu}$ of slots per frame, and the number $N_{slot}^{subframe,\mu}$ of slots per subframe in each subcarrier spacing configuration μ in the case of the normal CP.

TABLE 2

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 3 below shows the number $N_{symb}^{slot}$ of symbols per slot, the number $N_{slot}^{frame,\mu}$ of slops per frame, and the number $N_{slot}^{subframe,\mu}$ of slots per subframe in each subcarrier spacing configuration μ in the case of the extended CP.

TABLE 3

| μ | $N_{symb}^{slot}$ | $N_{slot}^{frame,\mu}$ | $N_{slot}^{subframe,\mu}$ |
|---|---|---|---|
| 2 | 12 | 40 | 4 |

Figure 2:
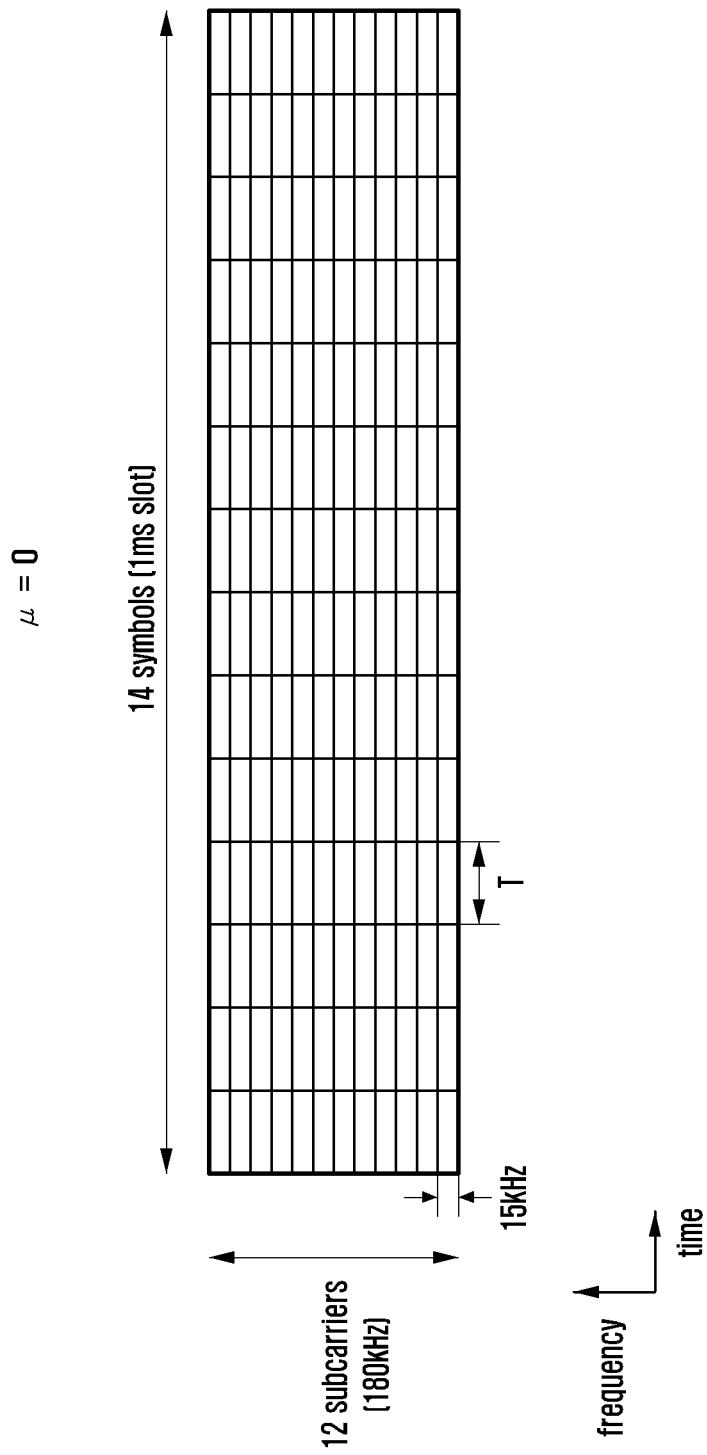
FIG. 2 illustrates a frame structure of a 5G system.
Figure 3:
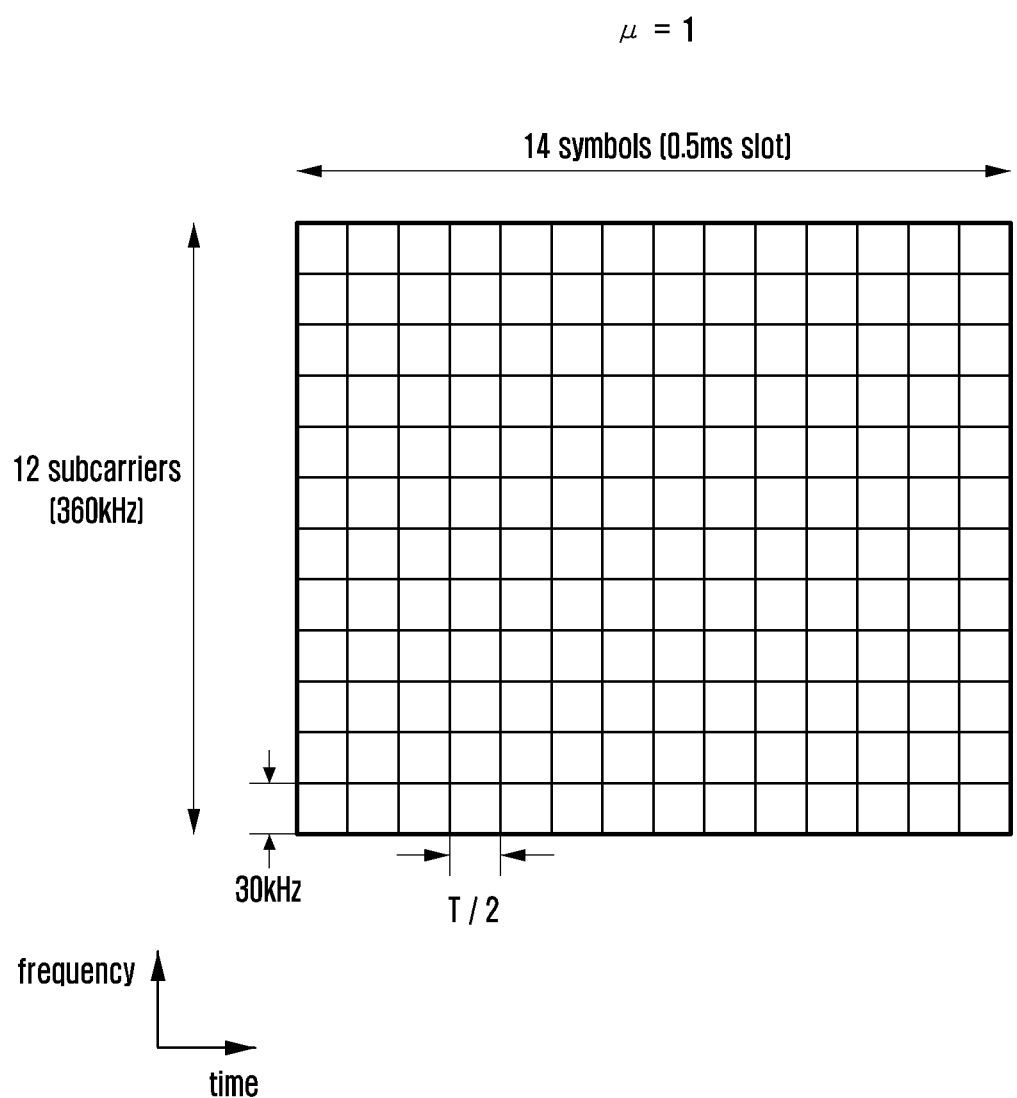
FIG. 3 illustrates another frame structure of a 5G system.
Figure 4:
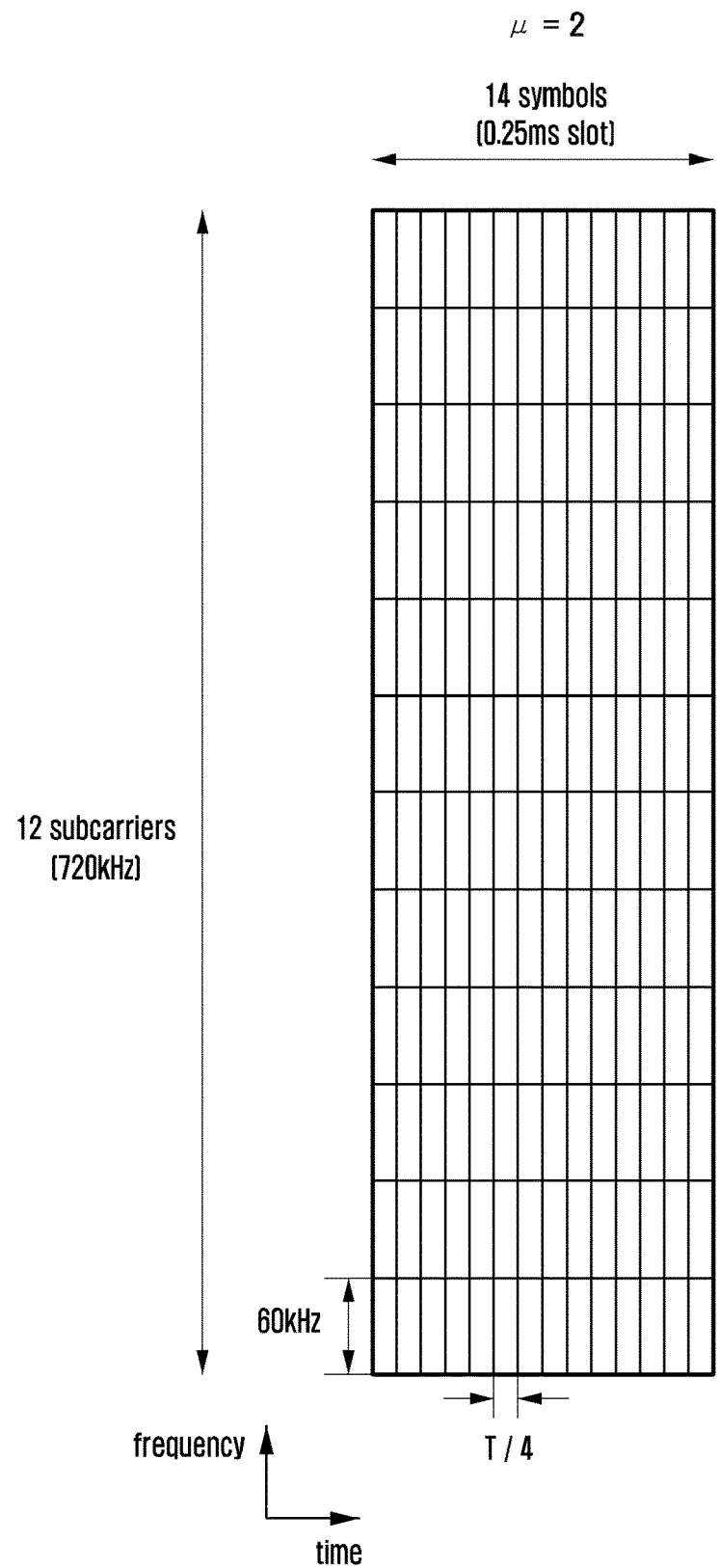
FIG. 4 illustrates another frame structure of a 5G system.

Each of FIGS. 2, 3, and 4 illustrates a frame structure of a 5G system. Specifically, FIG. 2 illustrates a frame structure when a subcarrier spacing configuration μ=0 in the case of the normal CP, FIG. 3 illustrates a frame structure when a subcarrier spacing configuration μ=1 in the case of the normal CP, and FIG. 4 illustrates a frame structure when a subcarrier spacing configuration μ=2 in the case of the normal CP. In FIGS. 2, 3, and 4, subcarrier spacing, the CP length, and the slot length are included as a parameter set defining the frame structure.

At the beginning of the 5G system, at least the coexistence of the conventional LTE/LTE-A system or dual-mode operation is expected. Accordingly, the conventional LTE/ TE-A system may provide a stable system operation, and the 5G system may serve to provide an improved service. Therefore, the frame structure of the 5G system should include at least the frame structure of the LTE/LTE-A system or a necessary parameter set (subcarrier spacing=15 kHz).

Referring to FIG. 2, in the frame structure having the subcarrier spacing configuration μ=0, the subcarrier spacing is 15 kHz, 14 symbols include a slot of 1 ms, and an RB includes 12 subcarriers (=180 kHz=12×15 kHz). In this case, 1 slot configures 1 subframe, and 10 subframes configure 1 frame.

Referring to FIG. 3, in the frame structure having the subcarrier spacing configuration μ=1, the subcarrier spacing is 30 kHz, 14 symbols include a slot of 0.5 ms, and an RB includes 12 subcarriers (=360 kHz=12×30 kHz). That is, compared to the frame structure of FIG. 2, the subcarrier spacing and the RB size increase two times, and the slot length and the symbol length decrease two time. In this case, 2 slots configure 1 subframe, and 20 subframes configure 1 frame.

Referring to FIG. 4, in the frame structure having the subcarrier spacing configuration μ=2, the subcarrier spacing is 60 kHz, 14 symbols include a subframe of 0.25 ms, and an RB includes 12 subcarriers (=720 kHz=12×60 kHz). Accordingly, compared to the frame structure of FIG. 2, the subcarrier spacing and the RB size increase four times, and the slot length and the symbol length decrease four times. In this case, 4 slots configure 1 subframe, and 40 subframes configure 1 frame.

When the frame structure is generalized, the subcarrier spacing, the CP length, and the slot length that correspond to the parameter set have the relation of an integer multiple for respective frame structures, thereby providing high expandability. A subframe having the fixed length of 1 ms is defined to indicate a reference time unit regardless of the existing frame structure.

The frame structures may be applied to various scenarios. Since a larger cell can be supported as the CP length is longer in a viewpoint of the cell size, the frame structure of FIG. 2 may support a relatively larger cell than the frame structures of FIGS. 3 and 4. Since longer subcarrier spacing is advantageous for reconstruction of phase noise of a high frequency band in a viewpoint of the operation frequency band, the frame structure of FIG. 4 may support a relatively higher operation frequency than the frame structures of FIGS. 2 and 3. Since it is more advantageous to support an ultra-low latency service like URLLC as the slot length which is the basic time unit for scheduling is shorter in a viewpoint of service, the frame structure of FIG. 4 is relatively more suitable for the URLLC service than the frame structures FIGS. 2 and 3.

In the following description of the disclosure, an uplink (UL) is a radio link through which the terminal transmits data or control signals to the BS, and a DL (DL) is a radio link through which the BS transmits data or control signals to the terminal.

In an initial access step in which the terminal initially accesses the system, the terminal may first synchronize DL time and frequency domains on the basis of a synchronization signal through a cell search and acquire a cell ID. The terminal may receive system information from the BS and acquire a system bandwidth or a basic parameter value related to transmission and reception of relevant control information. The synchronization signal is a signal that is a reference of a cell search, and subcarrier spacing suitable for a channel environment such as phase noise may be applied for each frequency band. In the case of a data channel or a control channel, different subcarrier spacings may be applied depending on the service type in order to support various services as described above.

Figure 5:
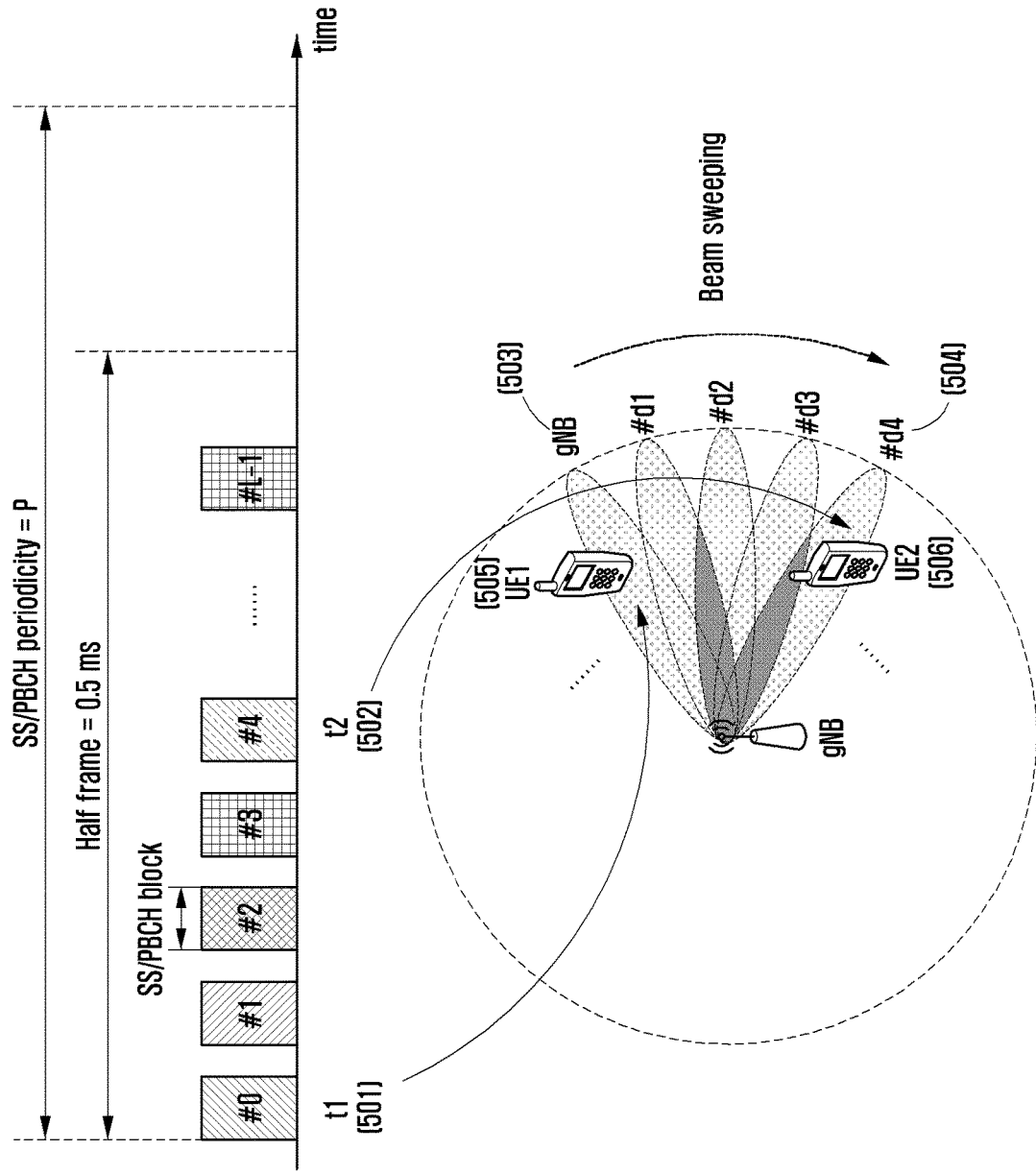
FIG. 5 illustrates a time domain mapping structure of a synchronization signal and a beam-sweeping operation.

FIG. 5 illustrates a time domain mapping structure of a synchronization signal and a beam-sweeping operation.

Prior to describing FIG. 5, the following elements are defined.

Primary SS (PSS): a signal that is a reference of DL time/frequency synchronization Secondary SS (SSS): a signal that is a reference of DL time/frequency synchronization and provides cell identifier (ID) information In addition, the SSS serves as a reference signal for demodulation of a PBCH.

PBCH: provides system information for transmitting and receiving a data channel and a control channel by the terminal. The system information may include search space-related control information indicating radio resource mapping information of a control channel and scheduling control information of a separate data channel for transmitting system information.

SS/PBCH block: consists of N OFDM symbols and includes a set of a PSS, an SSS, and a PBCH. For a system to which the beam-sweeping technology is applied, the SS/PBCH block is the minimum unit to which beam-sweeping is applied. In the 5G system, N=4. The BS may transmit a maximum of L SS/PBCH blocks, and the L SS/PBCH blocks may be mapped within a half frame (0.5 ms). The L SS/PBCH blocks are periodically repeated in units of a predetermined period P. The BS may inform the terminal of the period P through signaling. If there is no separate signaling for the period P, the terminal may apply a pre-appointed default value.

FIG. 5 illustrates the application of beam-sweeping in units of SS/PBCH blocks according to the lapse of time.

Referring to FIG. 5, terminal #1 (UE1) 505 may receive an SS/PBCH block through a beam radiated in direction #d0 503 by beamforming applied to SS/PBCH block #0 at a time t1 501. Terminal #2 (UE2) 506 may receive an SS/PBCH block through a beam radiated in direction #d4 504 by beamforming applied to SS/PBCH block #4 at a time t2 502. Each of the terminals may acquire, from the BS (gNB), an optimal synchronization signal through a beam radiated in the direction in which the terminal is located. For example, terminal #1 505 has difficulty in acquiring time/frequency synchronization and necessary system information from the SS/PBCH block through the beam radiated in direction #d4, far away from the location of terminal #1.

In performing a handover of a terminal from a current cell to an adjacent cell as well as an initial access procedure, a terminal receives an SS/PBCH block of the adjacent cell in order to determine a radio link state of the adjacent cell and acquire time/frequency synchronization of the adjacent cell.

After acquiring system information from the BS through the initial access procedure, the terminal may perform a random access procedure to switch the link with the BS to a connected state (or an RRC_CONNECTED state). After completing the random access procedure, the terminal switches to the connected state and is able to perform one-to-one communication with the BS.

Figure 6:
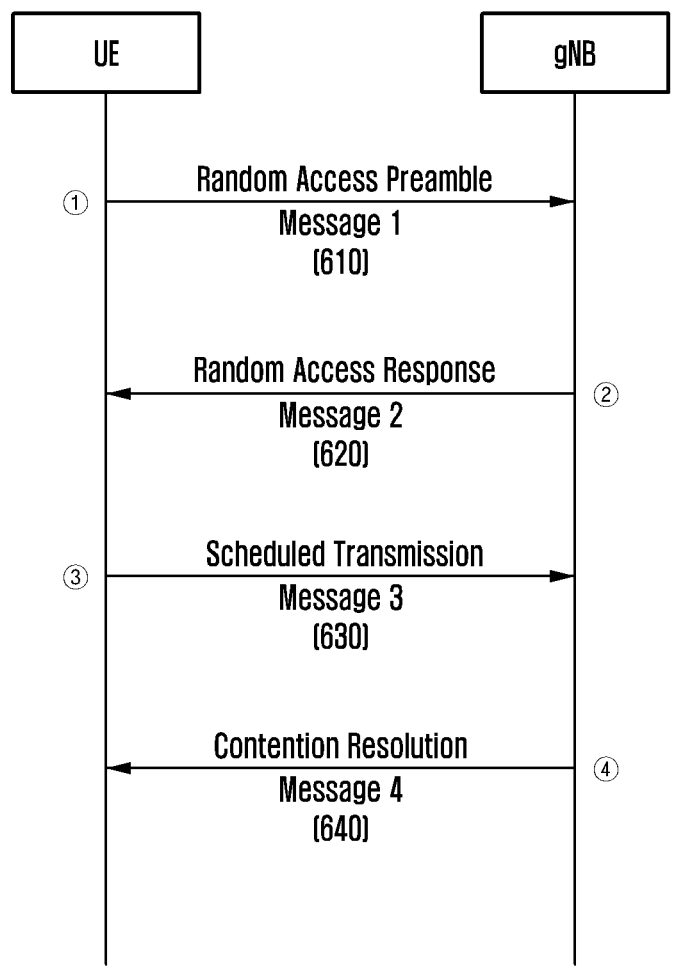
FIG. 6 illustrates a random access procedure according to an embodiment.

FIG. 6 illustrates a random access procedure according to an embodiment.

Referring to FIG. 6, in step 610 of the random access procedure, the terminal transmits a random access preamble to the BS. In the random access procedure, the random access preamble corresponding to an initial transmission message is called message 1. The BS measures a transmission delay value between the terminal and the BS and synchronizes the UL. At this time, the terminal may randomly select a random access preamble to be used from a random access preamble set given in advance by system information. Initial transmission power of the random access preamble may be determined according to pathloss between the BS and the terminal, measured by the terminal. Further, the terminal may determine a transmission beam direction of the random access preamble on the basis of the synchronization signal received from the BS and transmit the random access preamble.

In step 620, the BS transmits a UL signal transmission timing control command to the terminal based on the transmission delay value measured based on the random access preamble received in step 610. Further, the BS may transmit UL resources to be used by the terminal and a power control command as scheduling information. The scheduling information may include control information for an UL transmission beam of the terminal.

If the terminal does not receive a random access response (RAR) (message 2), which is scheduling information for UL data (message 3), from the BS within a predetermined time in step 620, step 610 may be performed again. If step 610 is performed again, the terminal may increase a probability of reception of the random access preamble by the BS by increasing transmission power of the random access preamble by a predetermined step (power ramping).

In step 630, the terminal transmits the UL data (message 3) including a terminal ID to the BS through a UL data channel (physical UL shared channel (PUSCH)) using the UL resources allocated in step 620. Transmission timing of the UL data channel for transmitting message 3 follows the timing control command received from the BS in step 620. Transmission power of the UL data channel for transmitting message 3 may be determined in consideration of the power control command received from the BS in step 620 and a power ramping value of the random access preamble. The UL data channel for transmitting message 3 is an initial UL data signal transmitted from the terminal to the BS after the terminal transmits the random access preamble.

In step 640, when it is determined that the terminal performs random access without any collision with another terminal, the BS transmits data (message 4) including an ID of the terminal transmitting UL data in step 630 to the corresponding terminal. When receiving the signal transmitted by the BS in step 640, the terminal may determine that the random access is successful. Further, the terminal may transmit a hybrid automatic repeat and request (HARQ)

message that indicates whether message 4 is successfully received or not (e.g., HARQ-acknowledgment (ACK)/negative ACK (NACK)) to the BS through a UL control channel (e.g., a physical UL control channel (PUCCH)).

If the BS fails to receive the data signal from the terminal due to collision between the data transmitted by the terminal in step 630 and data of another terminal, the BS does not transmit data to the terminal anymore. Accordingly, when the terminal does not receive data, which is transmitted in step 640, from the BS within a predetermined time, the terminal may determine that the random access procedure has failed and then start from step 610 again.

In a procedure in which the terminal performs a handover from a current cell to an adjacent cell as well as a random access procedure after an initial access procedure, the terminal performs the random access procedure in order to access the adjacent cell.

Figure 7:
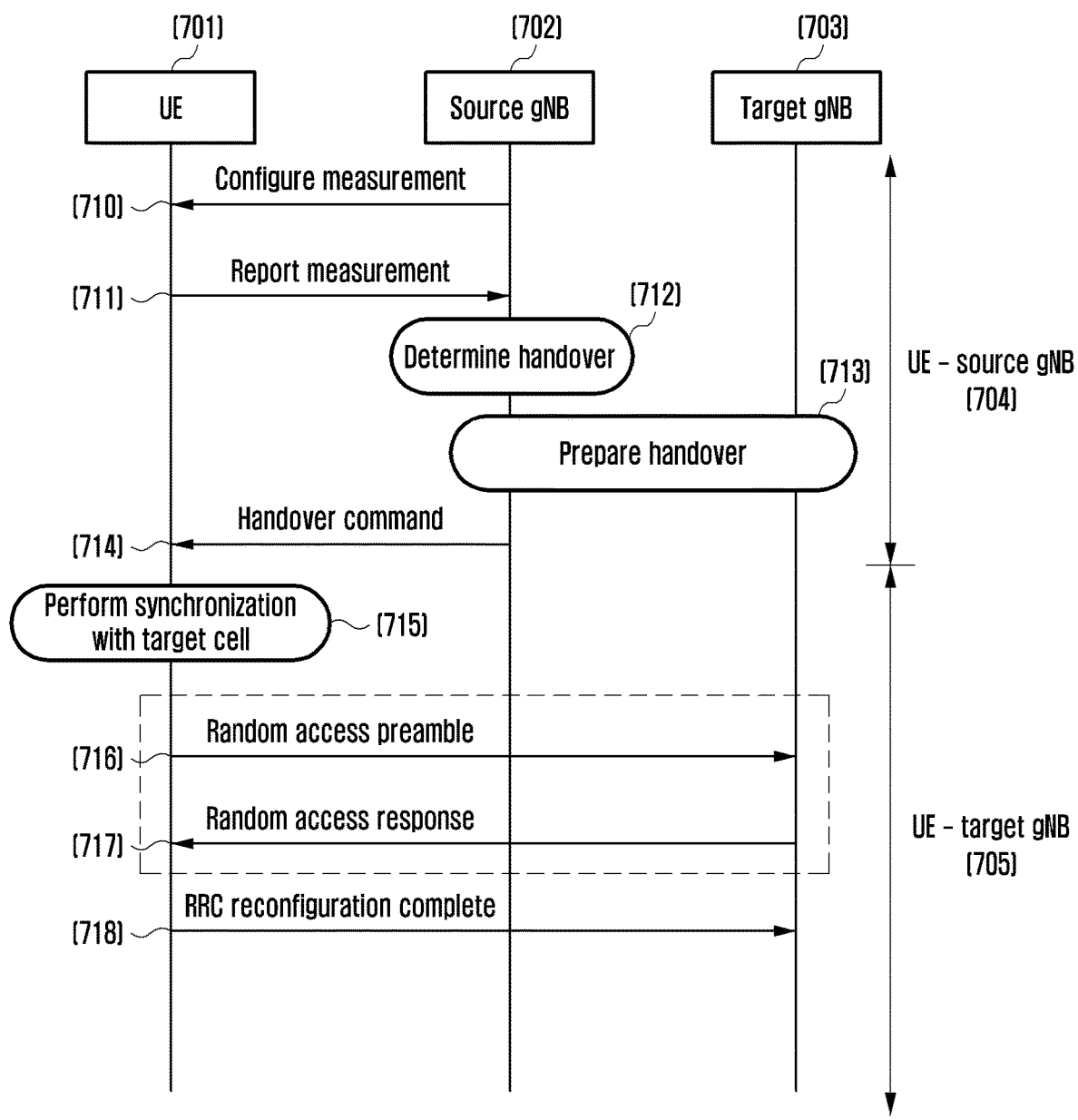
FIG. 7 illustrates a handover procedure according to an embodiment.

FIG. 7 illustrates a handover procedure according to an embodiment. Specifically, FIG. 7 illustrates a series of procedures in which a terminal accessing a first BS (source gNB) to communicate therewith changes to access a second BS (target gNB) through a handover procedure and communicate therewith. Unless specially mentioned, a BS (gNB) and a cell have the same meaning. Further, one BS may include a plurality of cells.

Referring to FIG. 7, in step 710, a source gNB 702 provides, to a terminal 701, measurement-related control information for measuring a radio link qualify of BSs near the terminal 701. The measurement-related control information may include at least one piece of relevant control information, such as information on a reference signal of adjacent BSs to be measured, subcarrier spacing of the reference signal, location of time/frequency domains of the reference signal, size of time/frequency domains of the reference signal, information indicating whether to perform a report periodically or based on a predetermined event when a measurement result measured by the terminal is reported to the BS, etc. The information on a reference signal of adjacent BSs to be measured may indicate whether the reference signal is an SS/PBCH or a CSI-RS.

The terminal 701 may measure a radio link quality between the terminal 701 and the adjacent BS according to the measurement configuration from the source gNB.

In step 711, the terminal 701 reports the measured radio link quality with the adjacent BS to the source gNB 702. In this case, the terminal 701 may receive UL resources for the measurement report from the source gNB 702. The measurement report may include a cell ID of the adjacent BS measured by the terminal 701 and control information such as the radio link quality of the corresponding cell.

In step 712, the source gNB 702 determines whether to handover the terminal 701 to another BS with reference to the measurement report of the terminal 701.

If it is determined to perform the handover of the terminal 701 to a target gNB 703, the source gNB 702 prepares the handover of the terminal 7001 by exchanging signaling between gNBs with the target gNB 703 in step 713. Step 713 may include a procedure in which the source gNB 702 makes a request for the handover of the terminal 701 to the target gNB 703, a procedure in which the target gNB 7003 responds to the request from the source gNB 702, and a procedure in which the target gNB 703 informs the source gNB 702 of advance information required for the handover of the terminal 701.

When preparation for the handover between the source gNB 702 and the target gNB 703 is completed, the source gNB 702 transmits a handover command to the terminal 701 in step 714.

A procedure of changing a radio resource control (RRC) connection configuration of the terminal 701 in the connected state corresponds to an RRC reconfiguration. The handover is a kind of RRC reconfiguration, and a BS may insert detailed information such as "reconfiguration With-Sync" to an "RRCreconfiguration" RRC message and transmit the handover command to the terminal 701. The handover command may include at least one piece of the relevant control information, such as a cell ID of the target gNB 703, configuration information for a common channel of the target gNB 703, random access-related information of the target gNB 703, a UE ID information to be used by the terminal 701 in the target gNB 703, etc.

In step 715, the terminal 701 disconnects the access to the source gNB 702 according to the received handover command and performs DL time/frequency synchronization of the target gNB 703 in order to access the target gNB 703. Accordingly, the terminal 701 may maintain the connected state with the source gNB 702 before step 715 as indicated by reference numeral 704, and may access the target gNB 703 after step 715 as indicated by reference numeral 705.

In step 716, the terminal 701 transmits the random access preamble to the target gNB 703 according to random access-related information of the target gNB 703, which the terminal 701 acquired in step 714.

In step 717, the target gNB 703 transmits a random access response signal for the random access preamble transmitted by the terminal 701 to the terminal 701. The random access response signal may include time/frequency resource information required for UL transmission of the terminal 701 in step 718.

In step 718, the terminal 701 transmits an "RRCReconfigurationComplete" message reporting successful completion of the handover procedure to the target gNB 703 according to the random access response signal received from the target gNB 703.

In order to improve the handover process performed as described above, research to reduce a handover delay time and decrease a signaling error probability is actively being conducted.

In one method, a RACH-less handover may reduce the handover delay time by the random access procedure by omitting the random access procedure of the terminal 701 to the target gNB 703. In the RACH-less handover, referring to FIG. 7, the handover operation may be performed while the remaining steps are maintained and steps 716 and 717 are omitted.

In this case, since the terminal 701 cannot synchronize UL timing with the target gNB 703 through steps 716 and 717 anymore, there may be a limitation in the operation. For example, the handover may be suitable for an environment in which a difference between UL timing between the terminal 701 and the source gNB 702 and UL timing between the terminal 701 and the target gNB 703 is within a predetermined range. Accordingly, the terminal 701 may infer UL timing with the target gNB 703 from UL timing with the source gNB 702. Alternatively, the terminal 701 may synchronize UL timing with the target gNB 703 through another method.

In the RACH-less handover procedure, a UL grant for transmitting the "RRCReconfigurationComplete" message from the terminal 701 to the target gNB 703 in step 718 may be included in advance in the handover command of step 714 and transmitted from the source gNB 702 to the terminal 701 (configured UL grant) or the terminal 701 may attempt blind reception of the UL grant from the target gNB 703.

Another method for improving the handover corresponds to a DC-based handover. While the terminal 701 performs transmission and reception to and from only one of the source gNB 702 and the target gNB 703 at a predetermined moment in the conventional handover procedure, the terminal 701 performs transmission and reception to both the source gNB 702 and the target gNB 703 during a handover process in the DC-based handover. Accordingly, the DC-based handover may increase processing complexity of the terminal 701 but minimize service disconnection due to the handover and reduce the signaling error probability. For example, in the description of the DC-based handover made with reference to FIG. 7, the terminal 701 may perform the handover procedure by minimizing service disconnection by continuing communication with the source gNB 702 and perform the random access procedure with the target gNB 703 even after step 715. After the handover is completed, the terminal 701 may disconnect communication with the source gNB 702 and perform communication with the target gNB 703.

Further, the RACH-less handover may be combined with the DC-based handover.

Embodiment 1

Embodiment 1 defines a fallback operation for switching to a RACH-based handover when the handover fails during a RACH-less handover process.

In the RACH-less handover, the handover may fail in at least the following cases.

Case 1: the terminal cannot synchronize UL timing with the target gNB.

Case 2: the terminal cannot configure appropriate UL signal transmission power for the target gNB.

According to the conventional RACH-based handover, the terminal may receive UL timing from the BS or calculate UL signal transmission power through the random access procedure in case 1 and case 2. Accordingly, when the terminal fails in the RACH-less handover, the terminal may fall back to the RACH-based handover and complete the handover operation. Embodiment 1 proposes different fallback methods.

Fallback Method 1

Fallback method 1 corresponds to a case in which a terminal receives, in advance, a configuration of UL resources to be initially transmitted to a target gNB when the handover is performed (configured UL grant).

Fallback Method 2

Fallback method 2 corresponds to a case in which a terminal attempts blind reception of a UL grant in order to receive UL resources from a target gNB when a handover is performed.

Figure 8:
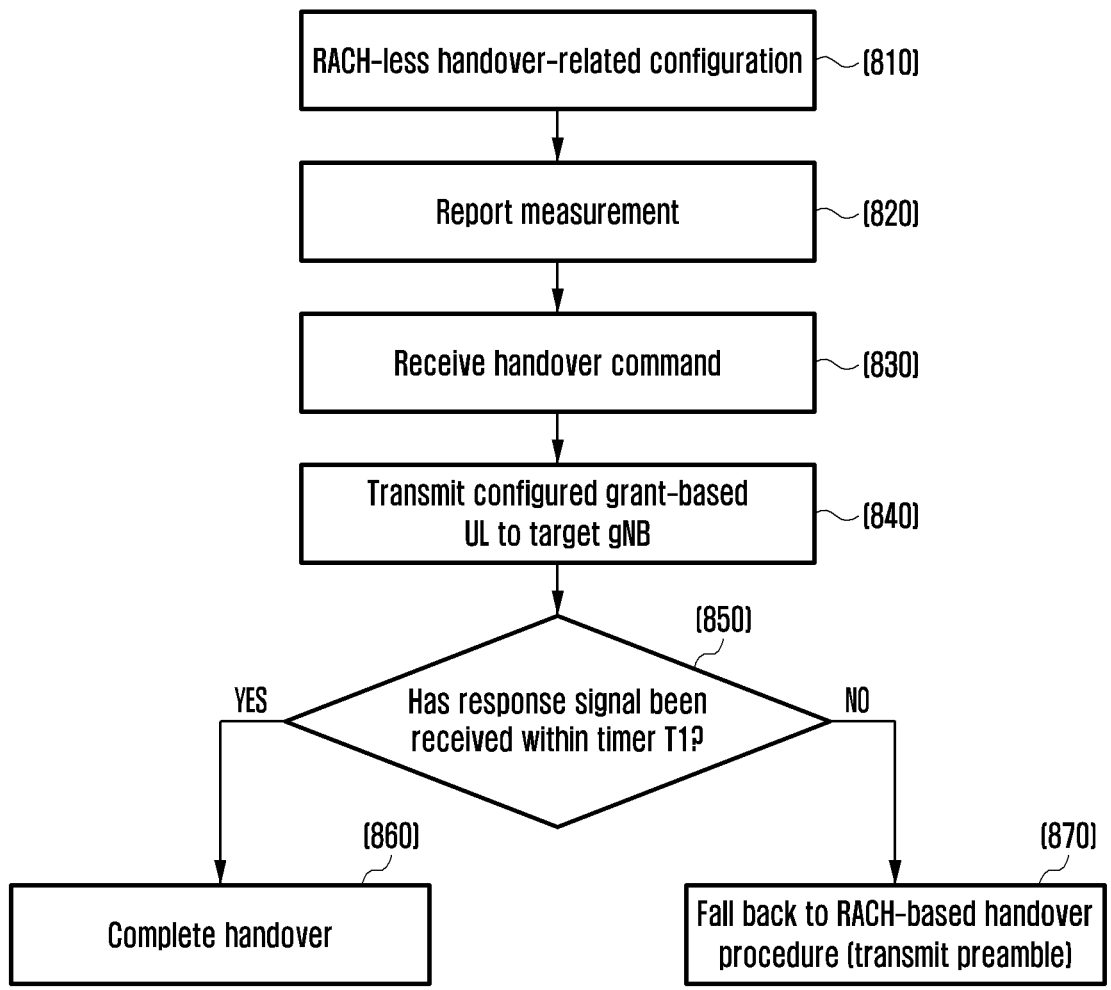
FIG. 8 is a flowchart illustrating a procedure in which a terminal falls back to a random access channel (RACH)-based handover according to an embodiment.

FIG. 8 is a flowchart illustrating a procedure in which a terminal falls back to a RACH-based handover according to an embodiment. Specifically, FIG. 8 illustrates a procedure in which the terminal falls back to the RACH-based handover according to fallback method 1.

Referring to FIG. 8, in step 810, the terminal receives a RACH-less handover-related configuration. The configuration may be configured in the terminal by the source gNB through signaling. The RACH-less handover-related configuration may include an indicator indicating the application of the RACH-less handover to the terminal and information (configured UL grant) on UL resources to be initially transmitted to the target gNB by the terminal. The RACH-less handover-related configuration may be configured independently from other signaling or configured as one element of other signaling. For example, when the BS configures measurement for measuring a radio link quality with a BS adjacent to the terminal or transmits a handover command to the terminal, the RACH-less handover-related configuration may be included as detailed control information.

In step 820, the terminal reports the measured radio link quality with the adjacent BS to the source gNB. If the source gNB determines the handover of the terminal, the source gNB may transmit a handover command to the terminal.

In step 830, the terminal receives the handover command and prepares the RACH-less-based handover to the target gNB. The RACH-less handover-related configuration of step 810 may be included in the handover command.

In step 840, the terminal transmits UL data to the target gNB through resources indicated by the "configured UL grant". The UL data may include an "RRCReconfigurationComplete" message reporting successful completion of the handover procedure.

In step 850, the terminal determines whether a response signal corresponding to the "RRCReconfigurationComplete" message is successfully received from the target gNB before expiration of a predetermined timer T1. The timer T1 may use a pre-appointed fixed value or may be informed of to the terminal by the source gNB through signaling. The signaling may be included in the RACH-less handover-related configuration, included in the measurement configuration, or included in the handover command. If the terminal successfully receives the response signal from the target gNB, the terminal determines that the handover is successfully completed and ends the handover procedure in step 860.

However, if the terminal does not successfully receive the response signal from the target gNB within the time T1, the terminal continuously performs the handover procedure by falling back to the RACH-based handover procedure in step 870. That is, the terminal may transmit the random access preamble according to the random access procedure to the target gNB. In order to support the fallback operation, various pieces of control information for the random access procedure of the terminal to the target gNB (e.g., time/frequency resource information for transmission of the random access preamble and random access sequence information) may be included in the handover command of step 830.

Figure 9:
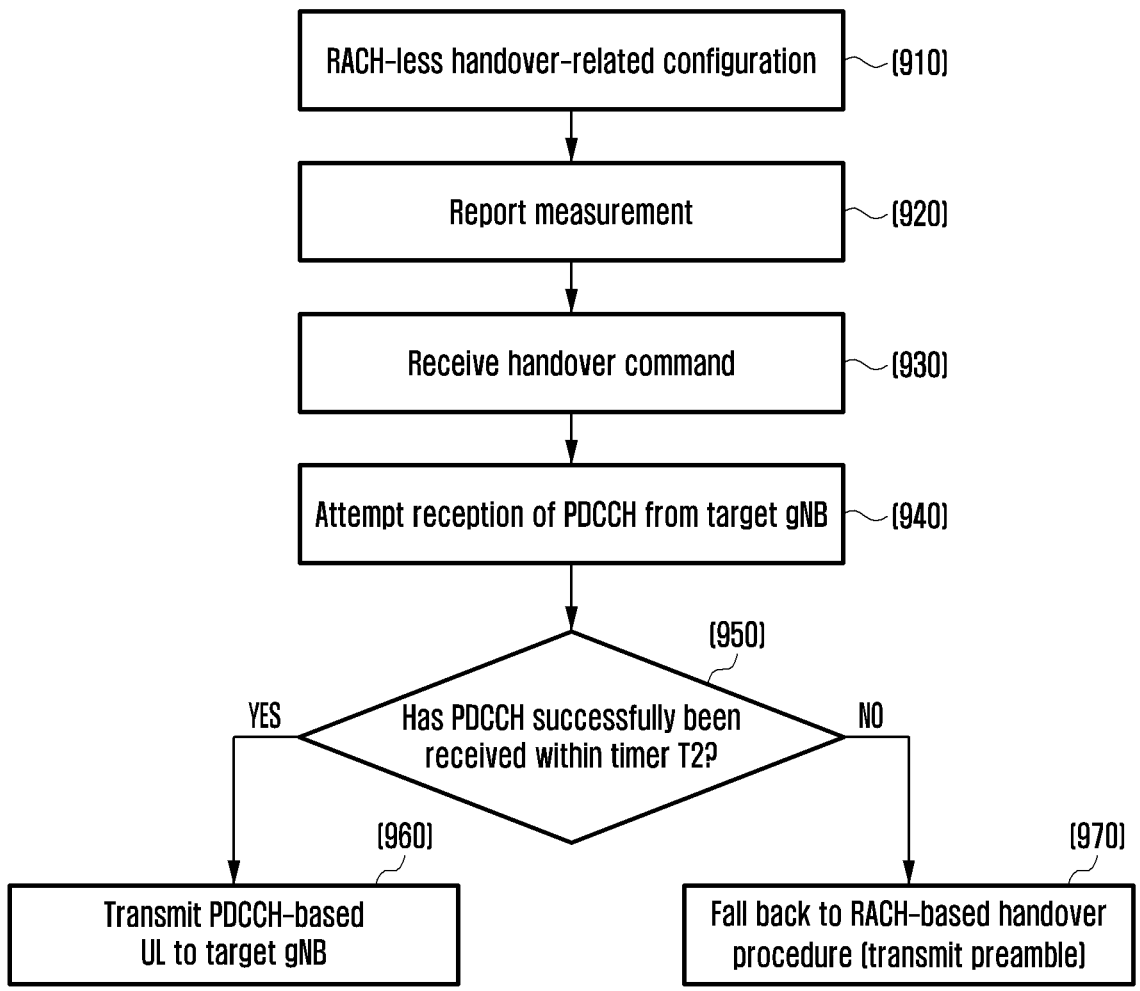
FIG. 9 is a flowchart illustrating a procedure in which a terminal falls back to a RACH-based handover according to an embodiment.

FIG. 9 is a flowchart illustrating a procedure in which a terminal falls back to a RACH-based handover according to an embodiment. Specifically, FIG. 9 illustrates a procedure in which the terminal falls back to the RACH-based handover according to fallback method 2.

Referring to FIG. 9, in step 910, the terminal receives a RACH-less handover-related configuration. The configuration may be configured in the terminal ley the source gNB through signaling. The RACH-less handover-related configuration may include an indicator indicating the application of the RACH-less handover to the terminal. The RACH-less handover-related configuration may be configured independently from other signaling or configured as one element of other signaling. For example, when the BS configures measurement for measuring a radio link quality with a BS adjacent to the terminal or transmits a handover command to the terminal, the RACH-less handover-related configuration may be included as detailed control information.

In step 920, the terminal reports the measured radio link quality with the adjacent BS to the source gNB. If the source gNB determines the handover of the terminal, the source gNB may transmit a handover command to the terminal.

In step 930, the terminal receives the handover command and prepares the RACH-less-based handover to the target gNB. The RACH-less handover-related configuration of step 910 may be included in the handover command.

In step 940, the terminal attempts reception of a physical DL control channel (PDCCH) including the UL grant from the target gNB.

In step 950, the terminal determines whether the PDCCH is successfully received from the target gNB before expiration of a predetermined timer T2. The timer T2 may use a pre-appointed fixed value or may be informed of to the terminal by the source gNB through signaling. The signaling may be included in the RACH-less handover-related configuration, included in the measurement configuration, or included in the handover command.

If the terminal successfully receives the PDCCH from the target gNB in step 950, the terminal transmits UL data to the target gNB through resources indicated by the UL grant of the PDCCH in step 960. The UL data may include an "RRCReconfigurationComplete" message reporting successful completion of the handover procedure. Thereafter, when the terminal receives a response signal corresponding to the "RRCReconfigurationComplete" message from the target gNB, the terminal may determine that the handover is successfully completed and end the handover procedure.

If the terminal does not successfully receive the PDCCH from the target gNB within the time T2 in step 950, the terminal continuously performs the handover procedure by falling back to the RACH-based handover procedure in step 970. That is, the terminal may transmit the random access preamble according to the random access procedure to the target gNB. In order to support the fallback operation, various pieces of control information for the random access procedure of the terminal to the target gNB (e.g., time/frequency resource information for transmission of the random access preamble and random access sequence information) may be included in the handover command of step 930.

The terminal operation for when the RACH-less handover fails may be also modified. For example, the terminal may continuously perform the handover operation by falling back to the RACH-based handover or continuously perform the RACH-less handover operation according to the BS configuration. Further, when the handover operation is continuously performed, the target gNB for the handover may be changed to another target gNB or the same target gNB may be continuously maintained.

For example, the terminal operations for when the RACH-less handover fails may be defined by method A, method B, method C, and method D below. The method to be applied by the terminal may be predetermined or configured in the terminal by the BS.

Method A: the terminal falls back to the RACH-based handover and continuously maintains the connection with the target gNB which the terminal conventionally desires to be handed over to. Method A is suitable for a scenario of completing the handover with high reliability by adding the random access procedure under the assumption that the target gNB is a BS most suitable for the handover.

Method B: the terminal may fall back to the RACH-based handover and attempt the handover to another target gNB rather than the target gNB which the terminal conventionally desires to be handed over to. Method B is suitable for a scenario of completing the handover with high reliability by adding the random access procedure when it is difficult to assume that the target gNB is a BS most suitable for the handover.

Method C: the terminal continuously performs the RACH-less handover and continuously maintains the target gNB which the terminal conventionally desires to be handed over to. Method C is suitable for a scenario of rapidly completing the handover by attempting the RACH-less handover again under the assumption that the target gNB is a BS most suitable for the handover.

Method D: the terminal may continuously perform the RACH-based handover and attempt the handover to another target gNB rather than the target gNB which the terminal conventionally desires to be handed over to. Method D is suitable for a scenario of rapidly completing the handover by attempting the RACH-less handover again when it is difficult to assume that the target gNB is a BS most suitable for the handover.

A reference for selecting the target gNB for the handover may be a radio link quality between the terminal and the target gNB, measured by the terminal, or may be selected by the BS and informed of to the terminal or directly selected by the terminal. For example, when the radio link quality of target gNB #1 is higher than the radio link quality of target gNB #2, the BS may inform the terminal of the handover to target NB #1 through signaling.

Method A or method B may be additionally modified. When the RACH-less handover fails, the terminal may fall back to the RACH-based handover, in which case the terminal may perform one of a 4-step RACH or a 2-step RACH. The random access procedure described in FIG. 6 includes a total of 4 steps and may be called a 4-step RACH. A 2-step RACH for simplifying the 4-step RACH procedure for the rapid random access operation is also currently researched. The 2-step RACH groups message 1 and message 3 of the conventional 4-step RACH into message A to configure them as one procedure and groups message 2 and message 4 of the 4-step RACH into message B to configure them as one procedure. Accordingly, when the 2-step RACH is applied to method A or method B as the fallback operation of the terminal, a quicker handover is possible than with the conventional 4-step RACH. Which one of the 4-step RACH and the 2-step RACH is applied as the fallback operation of the terminal may be informed of to the terminal by the BS through signaling.

Embodiment 2

Embodiment 2 defines an UL power control operation of the terminal in the RACH-less handover process.

Referring again to FIG. 7, the terminal 701 performing the RACH-less handover may receive a handover command from the source gNB 702 in step 714 and transmit UL data including an "RRCReconfigurationCompiete" message reporting successful completion of the handover procedure to the target gNB 703 in step 718. The terminal 701 may transmit the UL data to the BS through a PUSCH, which is a physical channel dedicated for UL data transmission.

UL data channel (e.g., a PUSCH) transmission power of the terminal may be determined based on Equation (1), below, expressed in units of dBm in transmission occasion "i" which is a time unit for signal transmission. When the terminal supports a plurality of serving cells through carrier aggregation, each parameter may be determined for each serving cell c and identified by an index c in the following equation. In addition, transmission power may be defined for each bandwidth part (BWP), which is a subband included in a system bandwidth, or for each transmission beam.

$$P_{PUSCH,c}(i) = \min\{P_{CMAX,c}(i), \text{Parameter set } A + \alpha_c(j) \cdot PL_c + f_c(i)\}[\text{dBm}] \quad (1)$$

In Equation (1), PCMAX refers to maximum transmission power allowed for the terminal and is defined by a power class of the terminal and a configuration of higher-layer signaling. $\alpha(j)$ refers to a value for partially compensating for pathloss between the BS and the terminal and is informed to the terminal by the BS through signaling, where $0 \leq \alpha(j) \leq 1$. PL refers to pathloss indicating a path loss between the BS and the terminal, and is calculated by the terminal based on a difference between transmission power of a reference signal (RS) transmitted by the BS and a terminal reception signal level of the RS. $f(i)$ refers to a power control state function calculated for transmission occasion i according to a power control command included in BS scheduling information. For the PUSCH that the terminal first transmits to the predetermined BS, an initial value $f(0)$ may be applied, and $f(0)$ may be calculated through the following method. Parameter set A refers to a value which the BS configures and signals to the terminal in order to compensate UL interference and includes at least one of items A to C below.

Item A. MPUSCH(i): refers to a number of RBs, which is an amount of frequency resources scheduled for transmission occasion i by the BS. Additionally, in order to reflect a bandwidth change according to subcarrier spacing to be applied to UL data transmission, MPUSCH(i) may be scaled to $2\mu \times \text{MPUSCH}(i)$ according to the subcarrier spacing configuration $\mu$.

Item B. PO_PUSCH(j): refers to a value which the BS configures in the terminal in consideration of UL interference. An index j is divided into j=0 for UL data transmission of the terminal, j=1 when radio resources for UL data transmission are preconfigured, and j≥2, for dynamically scheduled data during the random access procedure according to the type of scheduled data. Accordingly, PO_PUSCH (0) may be applied to message 3 in the random access process. For the PUSCH transmitted by the terminal in step 718, due to omission of the random access process by the RACH-less handover, PO_PUSCH(j) may be determined according to one of two methods. In a first method, when the terminal receives, in advance, a configuration of UL resources to be initially transmitted to the target gNB (configured UL grant), PO_PUSCH(1) may be applied. In a second method, when the terminal blindly attempts reception of the UL grant to receive UL resources from the target gNB, dynamic scheduling is performed and thus $P_{O\_PUSCH}(j)$, j≥2 may be applied.

Item C. $\Delta TF(i)$: refers to a format (e.g., a transport format (TF)) of data scheduled for transmission occasion i by the BS or a power offset according to a modulation and coding scheme (MCS), and Equation (1) may be embodied as shown in Equation (2) when detailed items of parameter set A are reflected.

Method 1: controlling power of the PUSCH that the terminal first transmits to the target gNB in the RACH-based handover.

Transmission power of the terminal may be determined according to Equations (1) and (2) above, and the initial value $f(0)$ may be calculated according to Equation (3) below.

$$f_c(0) = \Delta P_{rampup,c} + \delta_{msg2,c} \quad (3)$$

In Equation (3), $\Delta P_{rampup,c}$ denotes transmission power of a random access preamble which the terminal most recently transmitted and may satisfy Equation (4).

$$\Delta P_{rampup,c} = (\text{PREAMBLE\_TRANSMISSION\_COUNTER} - 1) \times \text{powerRampingStep} \quad (4)$$

In Equation (4), PREAMBLE_TRANSMISSION_COUNTER denotes a counter indicating the number of transmissions of the random access preamble during the random access procedure, and an initial value thereof is 1. When the terminal does not receive an RAR (message 2) from the BS for a predetermined time after transmission of the random access preamble, the terminal may determine that the BS fails in receiving the random access preamble and transmit the random access preamble again.

As for the PowerRampingStep, when the terminal transmits the random access preamble to the BS again, the terminal may increase transmission power of the random access preamble by a powerRampingStep (power ramping) and transmit the random access preamble to the BS.

In Equation (3), $\delta_{msg2,c}$ denotes an UL power control command included in the random access response signal.

Method 2: controlling power of the PUSCH which the terminal first transmits to the target gNB in the RACH-less handover.

Since the random access process is omitted, Equation (3) is not effective anymore. Accordingly, transmission power of the terminal is determined according to Equations (1) and (2), but the initial value $f(0)=0$ may be applied. The configuration of the respective parameters applied Equations (1) and (2) may be applied to the RACH-less handover and the RACH-based handover in common. Accordingly, when the terminal falls back from the RACH-less handover to the RACH-based handover, the configuration of the respective parameters applied to Equations (1) and (2) may be maintained, but the initial value $f(0)$ may be changed from $f(0)=0$ to Equation (3) and applied.

Method 3: controlling power of the PUSCH which the terminal first transmits to the target gNB in the RACH-less handover.

Similar Method 2, transmission power of the terminal may be determined according to Equations (1) and (2), but the initial value $f(0)=0$ may be applied. The configuration of the respective parameters applied Equations (1) and (2) may be independently applied to the RACH-less handover and the RACH-based handover. For example, parameter set #1 may be applied to the RACH-less handover, and parameter set #2 may be applied to the RACH-based handover.

$$P_{PUSCH,c}(i) = \min\left\{ \begin{array}{l} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array} \right\} [dBm] \quad (2)$$

A method of controlling power of the PUSCH which the terminal first transmits to the target gNB when the handover is performed may include the following methods according to whether the handover is the RACH-less handover.

Accordingly, when the terminal falls back from the RACH-less handover to the RACH-based handover, the configuration of the respective parameters applied to Equations (1) and (2) may be changed from parameter set #1 to parameter set #2 and applied, and the initial value f(0) may be changed from f(0)=0 to Equation (3) and applied.

Method 4: controlling power of the PUSCH which the terminal first transmits to the target gNB in the RACH-less handover.

The BS informs the terminal performing the RACH-less handover of the method to be used among Method 2 and Method 3 through signaling, Embodiment 3

In the RACH-less handover process, Embodiment 3 defines a method of operating the pre-configured UL grant when the handover is completed.

According to "fallback method 1" of Embodiment 1, the terminal may receive, in advance, a configuration of UL resources to be initially transmitted to the target gNB (configured UL grant). When the handover is completed, the terminal may operate the pre-configured UL resources through the following methods.

Method 1—Implicit Release

When the handover is completed, the terminal may determine that the pre-configured UL resources are not needed anymore and release the configuration. Method 1 may reduce signaling overhead and reduce a delay since the terminal makes the determination by itself without separate signaling of the BS.

Method 2—Explicit Release

When the handover is completed, the BS determines that UL resources pre-configured in the terminal are not needed anymore and releases the configuration through signaling.

Method 3—Reuse as the Configured UL Grant in the Target gNB

When the handover is completed, the terminal may continuously use the pre-configured UL resources as the configured grant to be used for UL signal transmission within the BS completing the handover. Accordingly, the BS may not require separate signaling for additionally configuring the configured grant in the terminal completing the handover.

Embodiment 4

Embodiment 4 defines a method of transmitting an UL signal by the terminal in a DC-based handover process.

As described above, the terminal may transmit UL signals to both the source gNB and the target gNB during the DC-based handover process. If a total sum of transmission power of an UL signal which the terminal desires to transmit to the source gNB and transmission power of an UL signal which the terminal desires to transmit to the target gNB at a predetermined moment is larger than a maximum power transmission limit of the terminal, it is required to define the terminal operation.

Embodiment 4 defines a priority of an UL transmission signal through the following methods according to whether a destination of the UL transmission signal is the source gNB or the target gNB.

Method 1—Giving a Priority to an UL Transmission Signal from the Terminal to the Target gNB Method 1 corresponds to a process in which the current terminal is handed over from the source gNB to the target gNB and thus gives a priority to the target gNB. For example, a random access preamble which the terminal transmits to the target gNB has a higher priority than an UL signal which the terminal transmits to the source gNB. Accordingly, it is advantageous to rapidly complete the handover.

Method 2—Giving a Priority to an UL Transmission Signal from the Terminal to the Source gNB.

Method 2 gives a priority to continuous maintenance of communication with the source gNB by the terminal. If the terminal still communicates with the source gNB even during the handover process, a higher priority is given to completion of communication with the source gNB that is currently performed.

Unlike Methods 1 and 2, Method 3 may define a priority according to a type of a signal which the terminal desires to transmit. UL transmission signals of the terminal are listed below in decreasing priority (highest to lowest).

1) A random access preamble

2) A PUCCH including HARQ-ACK control information or scheduling request (SR) control information or a PUSCH including HARQ-ACK
   A. A PUCCH is a physical layer control channel for transmitting UL control information
   B. HARQ-ACK control information indicates ACK or NACK as feedback information for supporting the HARQ operation
   C. An SR is control information making a request for allocating radio resources for transmitting UL data to the BS by the terminal 3) A PUCCH or a PUSCH including channel state information (CSI) feedback information
   A. A CSI is control information indicating a DL channel state and may support a scheduling operation of the BS 4) A PUSCH that does not include UL control information (UCI)
   A. UCI may include the HARQ-ACK control information, the SR, and the CSI 5) Sounding RS (SRS)
   A. An SRS is an eference signal by which the BS may measure an channel state If an UL signal which the terminal desires to transmit to the source gNB has the same priority as an UL signal that the terminal desires to transmit to the target gNB, the priority may be additionally determined according to Method 1 or Method 2.

Figure 10:
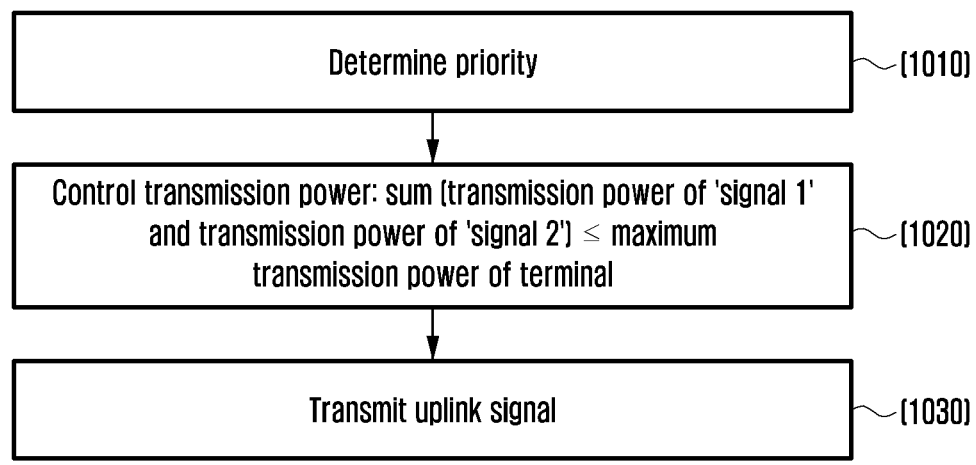
FIG. 10 is a flowchart illustrating a procedure in which a terminal transmits a UL signal in a dual connectivity (DC)-based handover according to an embodiment.

FIG. 10 is a flowchart illustrating a procedure in which a terminal transmits a UL signal in the DC-based handover according to an embodiment. Specifically, FIG. 10 illustrates a procedure in which the terminal transmits an UL signal according to Embodiment 4.

Referring to FIG. 10, in step 1010, the terminal determines a priority of a signal that the terminal desires to transmit according to Method 1, Method 2, and Method 3.

In step 1020, the terminal may maintain transmission power calculated by the terminal for a signal ("signal 1") determined to have a high priority in step 1010. The terminal may change transmission power of a signal ("signal 2") determined to have a low priority to a value lower than transmission power first calculated by the terminal and then control a total sum of the transmission power of "signal 1" and the transmission power of "signal 2" to be not larger than a maximum transmission power limit of the terminal. Alternatively, the terminal may control the transmission power of "signal 2" to be "0" and does not transmit "signal 2" to the BS.

In step 1030, the terminal transmits the UL signal with the transmission power controlled in step 1020.

Embodiment 5

Embodiment 5 defines a method of receiving a DL signal by a terminal in the DC-based handover process.

As described above, a terminal may receive DL signals from both the source gNB and the target gNB during the DC-based handover process. However, there may be a limitation in simultaneous reception according to the terminal. For example, in order to prevent an excessive increase in implementation complexity, a terminal cannot simultaneously receive beams when a beam of a DL signal which the terminal desires to receive from the source gNB is different from a beam of a DL signal that the terminal desires to receive from the target gNB at a predetermined moment.

Figure 11:
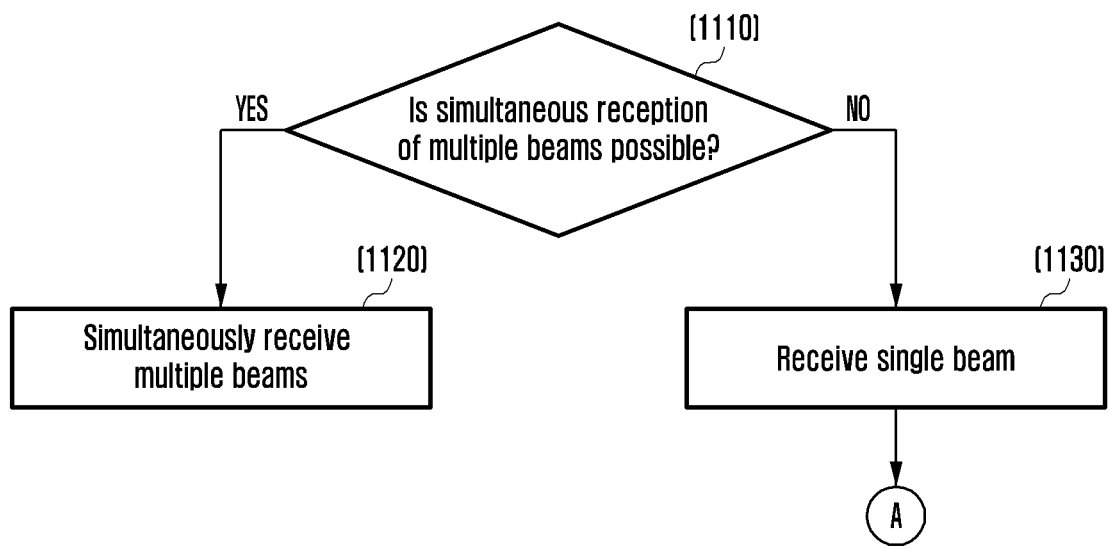
FIG. 11 is a flowchart illustrating a procedure in which a terminal receives a DL signal in a DC-based handover according to an embodiment.

FIG. 11 is a flowchart illustrating a procedure in which a terminal receives a DL signal in the DC-based handover according to an embodiment. FIG. 11 assumes simultaneous transmission of DL signals of different beams from one or a plurality of BSs to the terminal.

Referring to FIG. 11, in step 1110, the terminal determines a follow-up procedure according to whether multiple beams can be simultaneously received. The terminal that can simultaneously receive multiple beams receives the multiple beams in step 1120.

The operation of receiving the multiple beams may include the following cases.

Case 1: a DL signal and another DL signal received from the source gNB at a predetermined time point have different beams.

Case 2: a DL signal received from the source gNB and a DL signal received from the target gNB have different beams (that is, a handover process is being performed).

The terminal that cannot simultaneously receive multiple beams receives one DL signal in step 1130. The terminal procedure, after step 1130, may be embodied with reference to FIG. 12. Before step 1110, the terminal may report whether the terminal can simultaneously receive multiple beams to the BS through signaling.

Figure 12:
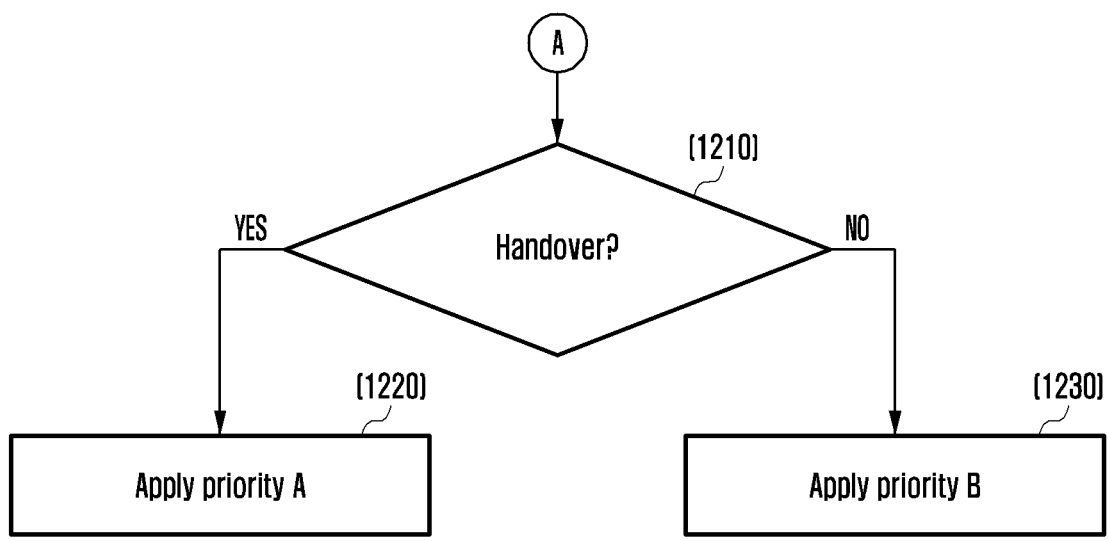
FIG. 12 is a flowchart illustrating a procedure in which a terminal receives a DL signal in a DC-based handover according to an embodiment.

FIG. 12 is a flowchart illustrating a procedure in which a terminal receives a DL signal in the DC-based handover according to an embodiments. Specifically, FIG. 12 illustrates a procedure in which the terminal receiving a single beam receives a DL signal in the DC-based handover.

Referring to FIG. 12, in step 1210, the terminal determines whether a handover is being performed. If the handover is not being performed, the terminal determines a DL signal to be received according to priority A in step 1220.

For example, priority A may include priority A-1 and priority A-2, and the terminal may determine a DL signal to be received according to A-1 and A-2.

Priority A-1: applies higher priorities to DL signals in an order of an SS/PBCH block, a PDCCH, and a physical DL data channel (physical DL shared channel (PDSCH) (priority: SS/PBCH block>PDCCH>PDSCH). The terminal may receive a DL signal having a high priority. The SS/PBCH block is a reference signal that synchronizes DL time/frequency and has a higher priority than other DL signals. Generally, in order to transmit a DL data channel, a control channel for scheduling the corresponding data channel should be transmitted, and thus the PDCCH may have a higher priority than the PDSCH.

Priority A-2: if DL signals have the same priority, a DL signal having a small cell index may be received. For example, when a PDSCH is transmitted from cell #1 and another PDSCH is simultaneously transmitted from cell #2, the terminal may receive the PDSCH of cell #1. Similarly, when an SS/PBCH block is transmitted from cell #1 and another SS/PBCH block is simultaneously transmitted from cell #2, the terminal may receive the SS/PBCH block of cell #1. In the case of PDCCHs, a PDCCH mapped to a CORESET may be determined to have a high priority according to the following priority by additionally considering an index of a control resource set (CORESET) that is a resource region to which PDCCHs are mapped and whether a search space of a PDCCH to be monitored by the terminal is a cell common search space (CSS) or a UE-specific search space (USS) as well as the cell index. For example, a priority of a "CORESET having the lowest index among CORESETs corresponding to a CSS of a cell having the lowest cell index among cells including the CSS" is higher than a priority of a "CORESET having the lowest index among CORESETs corresponding to a USS of a cell having the lowest cell index".

If the terminal is currently performing the handover in step 1210, the terminal determines a DL signal to be received according to priority B in step 1230.

The priority B may include priority B-1, B-2, or B-3, and the terminal may determine a DL signal to be received according to priority B-1, B-2, or B-3.

Priority B-1: the terminal may determine that a DL signal received from the target gNB has a high priority. Accordingly, it is advantageous to complete the rapid handover.

Priority B-2: the terminal may determine that a DL signal received from the source gNB has a high priority. If the terminal still communicates with the source gNB even during the handover process, it is effective for completion of communication with the source gNB that is currently performed.

Priority B-3: the BS informs the terminal of one of priority B-1 and priority B-2 to be applied during the handover process through signaling. The signaling may be included in the handover command. Accordingly, a flexible operation suitable for a situation is performed according to determination by the BS.

Embodiment 5 assumes the situation in which a plurality of BSs simultaneously transmit DL signals of different beams to the terminal, but the method of the disclosure may be extended and applied to another situation. For example, the method of the disclosure may be applied to a situation in which a plurality of DL signals use the same beam but DL transmission timings are different within a predetermined threshold.

Figure 13:
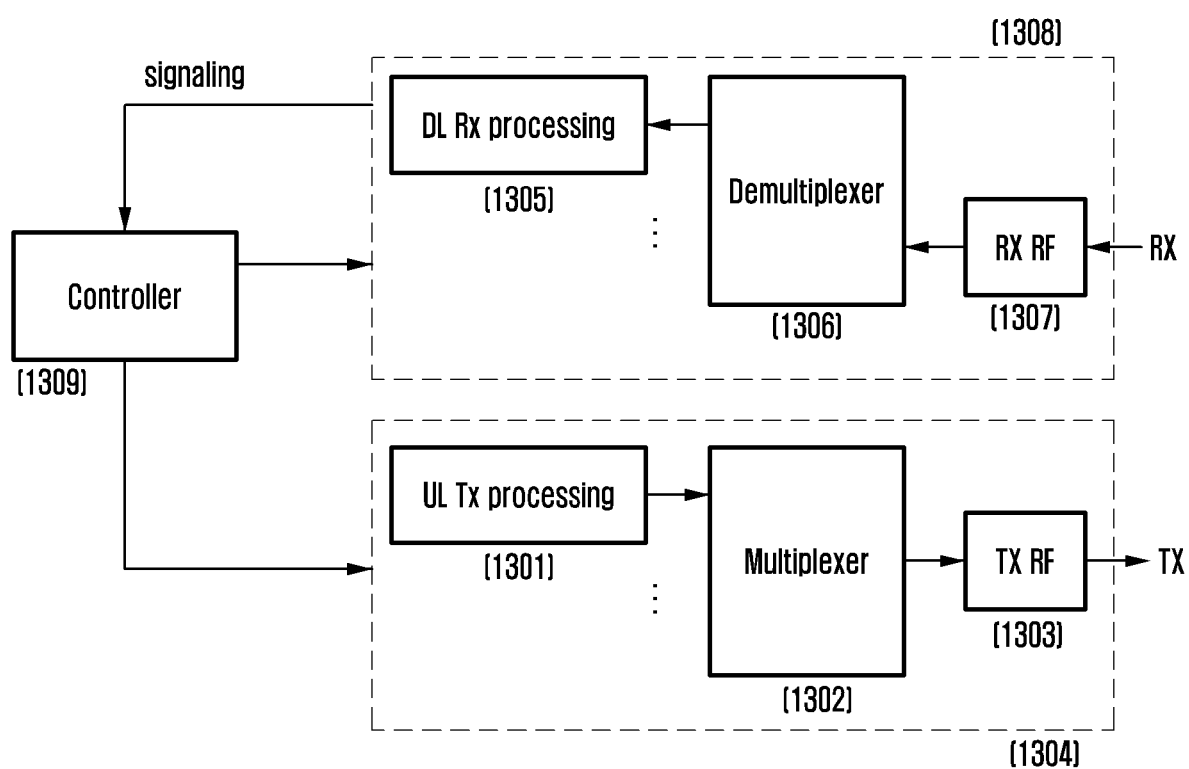
FIG. 13 illustrates a terminal according to an embodiment.

FIG. 13 illustrates a terminal according to an embodiment.

Referring to FIG. 13, the terminal includes a transmitter 1304, which includes a UL transmission processor 1301, and a multiplexer 1302, and an radio frequency (RF) transmitter 1303, a receiver 1308, which includes a DL signal reception-processor 1305, a demultiplexer 1306, and an RF receiver 1307, and a controller 1309. The controller 1309 may control elements of the receiver 1308 for receiving a data channel or a control channel transmitted by the BS and element blocks of the transmitter 1304 for transmitting an UL signal as described above.

The UL transmission processor 1301 of the transmitter 1304 may generate a signal to be transmitted through a process such as channel coding and modulation. The signal generated by the UL transmission processor 1301 is multiplexed with another UL signal by the multiplexer 1302, signal-processed by the RF transmitter 1303, and then transmitted to the BS.

The receiver 1308 of the terminal may de-multiplex the signal received from the BS and distribute the de-multiplexed signals to DL signal reception processing blocks. The DL signal reception processor 1305 may acquire control information or data transmitted by the BS by performing a process such as modulation and channel decoding of the DL signal by the BS. The terminal receiver 1308 may support the operation of the controller 1309 by applying the output result of the DL signal reception processor to the controller 1309.

The transmitter 1304 and the receiver 1308 of the terminal may be defined as one element block of a transceiver. The transceiver may transmit and receive a signal to and from another network entity. The transceiver 1410 may receive, for example, system information from the BS and receive a synchronization signal or a reference signal. The transceiver may transmit and receive information related to the initial access operation, the random access operation, and the handover operation according to various embodiments to and from the BS.

The controller 1309 may be defined as a circuit, an ASIC, or at least one processor.

The controller 1309 may control the overall operation of the UE. For example, the controller 1309 may control a signal flow between blocks to perform the operation according to the above-described flowcharts. Specifically, the controller 1309 may control the initial access operation, the random access operation, and the handover operation according to various embodiments.

Although not illustrated in drawings, the terminal may further include a storage unit, and the storage unit may store at least one piece of information transmitted and received through the transmitter 1304 or the receiver 1308 and information generated through the controller 1309. For example, the storage unit may store the initial access operation, the random access operation, and the handover operation according to various embodiments.

The storage unit may include a memory, and the memory may store a basic program for the operation of a communication processor, an application, and data such as configuration information according to various embodiments. The memory may include at least one storage medium among a flash memory type, a hard disk type, a multimedia card micro type, a card type memory (e.g., a secure digital (SD) memory, an extreme digital (XD) memory, etc.), a magnetic memory, a magnetic disk, an optical disk, a random access memory (RAM), a static RAM (SRAM), a read-only memory (ROM), a programmable read-only memory (PROM), and an electrically erasable programmable ROM (EEPROM). The processor may perform various operations using a variety of programs, content, and data stored in the memory.

Figure 14:
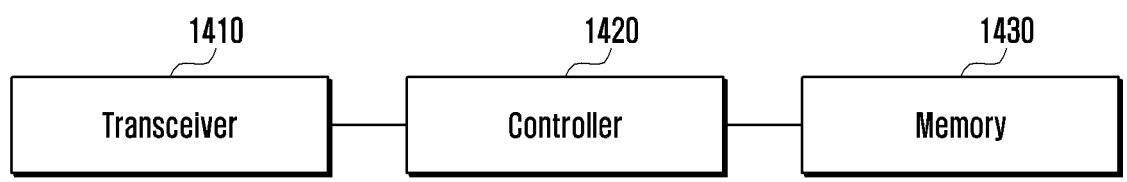
FIG. 14 illustrates a BS according to an embodiment.

FIG. 14 illustrates a BS according to an embodiment.

Referring to FIG. 14, the BS includes a transceiver 1410, a controller 1420, and a storage unit 1430. The controller may be defined as a circuit, an ASIC, or a processor.

The transceiver 1410 may transmit/receive a signal to/from another network entity. The transceiver 1410 may transmit system information to, for example, the terminal, and may transmit a synchronization signal or a reference signal. Further, the transceiver may transmit and receive information related to initial access operation, random access operation, and handover operation according to an embodiment to and from the terminal.

The controller 1420 may control the overall operation of the BS according to an embodiment proposed by the disclosure. The controller 1420 may control a signal flow between blocks to perform the operation according to the above-described flowchart, Specifically, the controller 1420 may control the initial access operation, the random access operation, and the handover operation according to an embodiment.

The storage unit 1430 may store at least one piece of information transmitted/received through the transceiver 1410 and information generated through the controller 1420. For example, the storage unit 1430 may store information related to the initial access operation, the random access operation, and the handover operation according to an embodiment.

The storage unit may include a memory, and the memory may store a basic program for the operation of a communication processor, an application, and data such as configuration information according to various embodiments. Further, the memory may include at least one storage medium among a flash memory type, a hard disk type, a multimedia card micro type, a card type memory (e.g., an SD memory, an XD memory, etc.), a magnetic memory, a magnetic disk, an optical disk, a RAM, an SRAM, a ROM, a PROM, and an EEPROM. The processor may perform various operations using a variety of programs, content, and data stored in the memory.

Although exemplary embodiments of the disclosure have been described and shown in the specification and the drawings by using particular terms, they have been used in a general sense merely to easily explain the technical contents of the disclosure and help with the understanding of the disclosure, and are not intended to limit the scope of the disclosure. It will be apparent to those skilled in the art that, in addition to the embodiments disclosed herein, other variants may be achieved on the basis of the technical idea of the disclosure. Further, the above respective embodiments may be employed in combination, as necessary.

In the above-described embodiments of the disclosure, an element may be expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. Terms as "a first", "a second", "the first", and "the second" may be used to simply distinguish a corresponding element from another, and does not limit the elements in other aspect (e.g., importance or order). If an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via another element (e.g., third element).

The term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an ASIC.

Various embodiments as set forth herein may be implemented as software (e.g., program) including one or more instructions that are stored in a storage medium (e.g., internal memory or external memory) that is readable by a machine (e.g., computer). The machine is a device that can invoke, from a storage medium, instructions stored in the storage medium and can be operated according to the invoked instructions, and may include auxiliary base stations or terminals according to various embodiments. When the instructions are executed by a processor (e.g., the controller 1309 in the terminal apparatus drawings or the controller 1420 in the base station apparatus drawings), the processor may perform functions corresponding to the instructions directly or by using other components under the control of the processor. The instructions may include codes generated or executed by a complier or an interpreter.

The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

Each of the methods according to various embodiments of the disclosure may be included and provided in a computer program product. The computer program product may be traded as a. product between a seller and a buyer. The computer program product may be distributed in the form of a machine-readable storage medium (e.g., compact disc (CD)-ROM), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities. One or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

The operations according to the embodiments described above, performed by the module, the program, or another element, may be carried out sequentially, in parallel, repeatedly, or heuristically, or one or more of the operations may be executed in a different order or omitted, or one or more other operations may be added.

The methods according to various embodiments described above may include methods performed through a combination of one or more of the figures according to various implementations. For example, FIGS. 1 to 14 illustrate operations related to a random access procedure or a handover procedure and may include methods performed through a combination of one or more figures according to various implementations.

According to the above-described embodiments, it is possible to minimize a handover delay and a handover failure possibility by defining a handover method of the terminal in a mobile communication system, While the disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. A method performed by a terminal in a communication system, the method comprising:
   receiving, from a source base station, a radio resource control (RRC) reconfiguration message for a handover;
   maintaining a connection for the source base station after receiving the RRC reconfiguration message;
   performing a random access to a target base station for the handover; and
   transmitting, to the target base station, a first uplink transmission for the target base station and cancelling a second uplink transmission for the source base station, in case that the first uplink transmission for the target base station and the second uplink transmission for the source base station are overlapped in a time domain for the handover,
   wherein a handover procedure for the handover maintains the connection for the source base station after receiving the RRC reconfiguration message and until disconnection of the source base station after completing the random access to the target base station.

2. The method of claim 1, wherein after completing the handover where the source base station is disconnected, uplink transmission is switched from the source base station to the target base station.

3. The method of claim 1, wherein the RRC reconfiguration message comprises random access related information of the target base station and information on a cell identifier of the target base station.

4. The method of claim 1, further comprising transmitting, to the target base station, an RRC reconfiguration complete message after the random access procedure is successfully completed.

5. The method of claim 1, wherein transmitting the first uplink transmission and cancelling the second uplink transmission are performed further in case that a sum of a first transmission power for the first uplink transmission and a second transmission power for the second uplink transmission exceeds a maximum transmission power of the terminal in the time domain.

6. The method of claim 5, wherein in case that the sum of the first transmission power and the second transmission power does not exceed the maximum transmission power in the time domain, the first uplink transmission is performed in the time domain and the second uplink transmission is performed in the time domain.

7. A method performed by a target base station in a communication system, the method comprising:
receiving, from a source base station, a handover command for a handover;
transmitting, to the source base station, a response message for the handover;
performing a random access with a terminal, wherein a connection of the terminal for the source base station is maintained by the terminal after reception of a radio resource control (RRC) reconfiguration message for the handover, by the terminal, from the source base station; and
in case that a first uplink transmission for the target base station and a second uplink transmission for the source base station are overlapped in a time domain for the handover, receiving the first uplink transmission, from the terminal,
wherein the second uplink transmission of the terminal is cancelled by the terminal, and
wherein a handover procedure for the handover maintains the connection for the source base station after the reception of the RRC reconfiguration message and until disconnection of the source base station after completing the random access to the target base station.

8. The method of claim 7, wherein after completion of the handover where the source base station is disconnected, uplink transmission from the terminal is switched from the source base station to the target base station.

9. The method of claim 7, wherein the reception of the first uplink transmission and the cancellation of the second uplink transmission are performed further in case that a sum of a first transmission power for the first uplink transmission and a second transmission power for the second uplink transmission exceeds a maximum transmission power of the terminal in the time domain.

10. The method of claim 9, wherein in case that the sum of the first transmission power and the second transmission power does not exceed the maximum transmission power in the time domain, the first uplink transmission is received in the time domain and the second uplink transmission is received in the time domain.

11. A terminal in a communication system, the terminal comprising:
a transceiver; and
a processor coupled to the transceiver and configured to:
receive, from a source base station, a radio resource control (RRC) reconfiguration message for a handover,
maintain a connection for the source base station after receiving the RRC reconfiguration message,
perform a random access to a target base station for the handover, and
transmit, to the target base station, a first uplink transmission for the target base station and cancel a second uplink transmission for the source base station, in case that the first uplink transmission for the target base station and the second uplink transmission for the source base station are overlapped in a time domain for the handover,
wherein a handover procedure for the handover maintains the connection for the source base station after receiving the RRC reconfiguration message and until disconnection of the source base station after completing the random access to the target base station.

12. The terminal of claim 11, wherein after completing the handover where the source base station is disconnected, uplink transmission is switched from the source base station to the target base station.

13. The terminal of claim 11, wherein the RRC reconfiguration message comprises random access related information of the target base station and information on a cell identifier of the target base station.

14. The terminal of claim 11, wherein the processor is further configured to transmit, to the target base station, an RRC reconfiguration complete message after the random access procedure is successfully completed.

15. The terminal of claim 11, wherein transmitting the first uplink transmission and cancelling the second uplink transmission are performed further in case that a sum of a first transmission power for the first uplink transmission and a second transmission power for the second uplink transmission exceeds a maximum transmission power of the terminal in the time domain.

16. The terminal of claim 15, wherein in case that the sum of the first transmission power and the second transmission power does not exceed the maximum transmission power in the time domain, the first uplink transmission is performed in the time domain and the second uplink transmission is performed in the time domain.

17. A target base station in a communication system, the target base station comprising:
a transceiver; and
a processor coupled to the transceiver and configured to
receive, from a source base station, a handover command for a handover,
transmit, to the source base station, a response message for the handover,
perform a random access with a terminal, wherein a connection of the terminal for the source base station is maintained by the terminal after reception of a radio resource control (RRC) reconfiguration message for the handover, by the terminal, from the source base station, and
in case that a first uplink transmission for the target base station and a second uplink transmission for the source base station are overlapped in a time domain for the handover, receive the first uplink transmission, from the terminal,
wherein the second uplink transmission of the terminal is cancelled by the terminal, and
wherein a handover procedure for the handover maintains the connection for the source base station after the reception of the RRC reconfiguration message and until disconnection of the source base station after completing the random access to the target base station.

18. The target base station of claim 17, wherein after completing the handover where the source base station is disconnected, uplink transmission from the terminal is switched from the source base station to the target base station.

19. The target base station of claim 17, wherein receiving the first uplink transmission and cancelling the second uplink transmission are performed further in case that a sum of a first transmission power for the first uplink transmission and a second transmission power for the second uplink transmission exceeds a maximum transmission power of the terminal in the time domain.

20. The target base station of claim 19, wherein in case that the sum of the first transmission power and the second transmission power does not exceed the maximum transmission power in the time domain, the first uplink transmission is received in the time domain and the second uplink transmission is received in the time domain.

* * * * *